United States Patent
Kletter

(10) Patent No.: US 8,144,947 B2
(45) Date of Patent: Mar. 27, 2012

(54) SYSTEM AND METHOD FOR FINDING A PICTURE IMAGE IN AN IMAGE COLLECTION USING LOCALIZED TWO-DIMENSIONAL VISUAL FINGERPRINTS

(75) Inventor: Doron Kletter, San Mateo, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 791 days.

(21) Appl. No.: 12/163,186

(22) Filed: Jun. 27, 2008

(65) Prior Publication Data
US 2009/0324026 A1 Dec. 31, 2009

(51) Int. Cl.
G06K 9/54 (2006.01)
G06K 9/00 (2006.01)

(52) U.S. Cl. .......................... 382/124; 382/100; 382/305

(58) Field of Classification Search .................. 382/124, 382/125, 115, 100, 217, 218, 305
See application file for complete search history.

(56) References Cited

U.S. PATENT DOCUMENTS

| | | | | |
|---|---|---|---|---|
| 5,465,303 | A | * | 11/1995 | Levison et al. ............... 382/124 |
| 5,613,014 | A | * | 3/1997 | Eshera et al. ................. 382/124 |
| 6,041,133 | A | * | 3/2000 | Califano et al. .............. 382/124 |
| 7,359,532 | B2 | * | 4/2008 | Acharya et al. ............... 382/124 |
| 7,844,594 | B1 | | 11/2010 | Holt et al. |
| 2006/0104484 | A1 | * | 5/2006 | Bolle et al. ..................... 382/115 |
| 2008/0317278 | A1 | * | 12/2008 | Lefebvre et al. .............. 382/100 |
| 2009/0176566 | A1 | * | 7/2009 | Kelly ............................... 463/29 |
| 2009/0324087 | A1 | | 12/2009 | Kletter |
| 2009/0324100 | A1 | | 12/2009 | Kletter et al. |

OTHER PUBLICATIONS

Matthew Brown and David G. Lowe, "Invariant Features from Interest Point Groups." In British Machine Vision Conference, BMVC 2002, Cardiff, Wales, pp. 656-665 (here typed as 253-262), Sep. 2002.

Chris Harris and Mike Stephens, "A Combined Corner and Edge Detector." Proceedings of the Alvey Vision Conference, pp. 147-151, 1988.

Timor Kadir, Andrew Zisserman and Michael Brady, "An Affine Invariant Salient Region Detector." Computer Vision—ECCV 2 004, pp. 228-241.

(Continued)

Primary Examiner — Yon Couso
(74) Attorney, Agent, or Firm — Fay Sharpe LLP

(57) ABSTRACT

An image management method and system provides for storing, indexing, searching and/or retrieving image data. The content of an image collection is pre-processed to identify stable and repeatable keypoints for each image in the collection. Fingerprint information is computed from local groups of keypoints, and the resulting fingerprint information is stored in a compact fingerprint database. The computing of the fingerprint information is based on combinations of a subgroup of the strongest keypoints in an image, called anchor keypoints, in addition to a number of non-anchor keypoints. For each fingerprint in the compact fingerprint database, a sequence of candidate fingerprint combinations is generated and stored in a Fan Tree and/or hashtable and a corresponding fingerprint data structure. The sequence of fingerprint combinations allows several non-anchor keypoints to be missing, while still allowing the system and method to correctly detect fingerprints with high accuracy. A realtime image query is performed by identifying keypoints and computing fingerprints from the query image and matching the query fingerprints to the existing Fan Tree and/or hashtable fingerprint data to determine the best matching image or set of images within the collection. At least one target image is retrieved based on the determining operation, and the retrieved target image is displayed, printed, stored and/or transmitted.

20 Claims, 19 Drawing Sheets

OTHER PUBLICATIONS

Yan Ke and Rahul Sukthankar, "PCA-SIFT: A More Distinctive Representation for Local Image Descriptors." In Conference on Computer Vision and Pattern Recognition, pp. 111-119, 2000.

Luke Ledwich and Stephan Williams, "Reduced SIFT Features for Image Retrieval and Indoor Localization." IEEE Transaction on Pattern Analysis and Machine Intelligence, vol. 19, No. 5. May 1997.

Vincent Lepetit and Pascal Fua, " Randomized Trees for Keypoint Recognition." Proceedings IEEE Computer Society Conference on Computer Vision and Pattern Recognition CVPRO5, vol. 2, pp. 775-781, 2005.

Vincent Lepetit and Pascal Fua, "Towards Regognizing Feature Points using Classification Trees," Technical Report IC/2004/74 EPFL, 2004.

Vincent Lepetit, Julien Pilet and Pascal Fua, "Point Matching as a Classification Problem for Fast and Robust Object Pose Estimation." In Conference on Computer Vision, pp. 128-142, Copenhagen, 2002.

David G. Lowe, "Distinctive Image Features from Scale-Invariant Keypoints." International Journal of Computer Vision, vol. 60, No. 2, pp. 91-110, 2004.

Krystian Mikolajczyk,and Cordelia Shcmid "An Affine Invariant Interest Point Detector." In European Conference on Computer Vision and Pattern Recognition, vol. 1, pp. 128-142, 2002.

Krystian Mikolajczyk,and Cordelia Shcmid "A performance Evaluation of Local Descriptors." In Conference on Computer Vision and Pattern Recognition, pp. 257-263, Jun. 2003, (paper shows a draft date of Feb. 23, 2005).

Julien Pilet, Vincent Lepetit and Pascal Fua, "Fast Non-Rigid Surface Detection, Registration and Realistic Augmentation." International Journal of Computer Vision, Springer 2007.

Cordelia Shcmid and Roger Mohr, "Local Greyvalue Invariants for Image Retrieval." IEEE Transaction on Pattern Analysis and Machine Intelligence, vol. 19, No. 5, May 1997.

Lindeberg,T, "Feature Detection with Automatic Scale Selection." International Journal of Computer Vision, vol. 30, No. 2, pp. 79-116, 1998.

Viola, P., and Jones, M., "Rapid object detection using a boosted cascade of simple features." In Proceedings of Computer Vision and Pattern Recognition CVPR, vol. I, pp. 511-518, 2001.

L. M. J. Florack, Bart M. Ter Haar Romeny, J.J Koenderink and M. A. Viergever, "General intensity transformations and differential invariants," In Journal of Mathematical Imaging and Vision, vol. 4, No. 2, pp. 171-187, May 1994.

A. Baumberg, "Reliable Features Matching across Widely Separated Views" In Conference on Computer Vision and Pattern Recognition, vol. 1, pp. 774-781, 2000.

F. Schaffalitzky and A. Zisserman, "Multi-View Matching for Unordered Image Sets or How do I Organize My Holiday Snaps" In European Conference on Computer Vision, vol. 1, pp. 414-431, 2002.

W. T. Freeman and E. H. Adelson, "The Design and Use of Steerable Filters" Transactions on Pattern Analysis and Machine Intelligence, vol. 13, pp. 891-906, 1991.

G. Carneiro and A. Jepson, "Multi-Scale Phase-based Local Features" In Conference on Computer Vision and Pattern Recognition, vol. 1, pp. 736-743, 2003.

Lowe, "Distinctive Image Features From Scale-Invariant Keypoints", Int. J. Of Computer Vision, 2004.

Lepetit et al., "Keypoint Recognition Using Randomized Trees", IEEE-PAMI, 2006.

* cited by examiner

```
<Fingerprint Data Base>_
  <Page ID="83">
    <Fingerprint Id="0">
      <r0="7777566342465232442556616616676777">
      <r1="6775363332363222442556616616676777">
      <r2="3461363667363222442546523244256 7777">
      <r3="4460363667363332442556634244251 6677">
      <r4="1460461667753322257773422325 16677">
      <r5="1460361637675632632277766265 2266667">
      <r6="1440341336675333332477756445 3456667">
      <r7="1446346366677363362477756346 2456116">
      <r8="4466556665445773665251577466 7256643">
      <r9="1354042320265540771051577466 7256643">
      <r10="2565154431265540771044577366 5256643">
      <r11="7777154431042320771056666566 5266723">
      <r12="7777565431354320540046666577 3277424">
      <r13="7772655411544206501466565453 515476">
      <r14="7772551431340222547446566457 655766">
      <r15="7772561541350432657446556447 651765">
      ...

<Fingerprint Id="1">
    ...
```

FIG. 9

SYSTEM AND METHOD FOR FINDING A PICTURE IMAGE IN AN IMAGE COLLECTION USING LOCALIZED TWO-DIMENSIONAL VISUAL FINGERPRINTS

BACKGROUND

The present application is directed to a computer operable system and method which incorporates a software program and algorithm for finding an image of a target picture or picture set in a large image collection based on an image of a query picture image which is an imperfect copy of the target picture image.

The query image may be captured by at least one of, but not limited to, a digital camera, personal data assistant, document scanner, text reader, video camera, motion picture camera, computer, cell phone camera or other device capable of generating image representations of the target image.

The target image may be displayed on a monitor or a computer screen and its picture directly taken by one of the above devices, or the target image may first be printed on a printer or a similar output device and a picture taken by one of the above devices for the reproduction of the target image. Alternatively, the query image could be reproduced from a stored electronic version of a query image.

Due to the manner and devices used to capture the query image, often the captured query image will be of a lower resolution, blurry, distorted by rotation and perspective viewing conditions, and of uneven lightness as compared to the target image.

Thus, the present application is directed to finding or matching similar images in large image collections, although it can also make use of additional types of image content such as text and line drawings. Finding natural pictures is potentially a more difficult problem than finding or matching text or line art images of a collection since the content of such pictures is continuous in the luminance/grayscale domain and it is therefore far more challenging to identify robust and reliable keypoints.

A typical method for matching image correspondence is composed of the following steps:

(1) In a first step, keypoints are identified for distinctive locations in the image such as corners, junctions, and/or light or dark blobs. The goal is to reliably find the same keypoints under different viewing conditions, noise, and various image degradations. One method among the many existing methods, is a Scalable Invariant Feature Transform (SIFT) method discussed by D. G. Lowe in "Distinctive Image Features From Scale-invariant Keypoints," *International Journal of Computer Vision*, Vol. 60, No. 2, pp. 91-110, 2004. Another method is the PCA-SIFT method described by Ke and Sukthankar in "PCA-SIFT: A More Distinctive Representation For Local Image Descriptors," in *Conference on Computer Vision and Pattern Recognition*, pp. 111-119, 2000. Both methods require a considerable amount of computations that limits the performance for large image collections.

(2) In the second step, a feature vector called a "descriptor" is calculated from the local neighborhood of every keypoint. The descriptor has to be highly distinctive in order to identify its corresponding keypoint with high probability relative to all the other keypoints in the image. In addition, the descriptor must be robust to noise, keypoint identification errors (e.g., missing or extra keypoints), camera-to-target image geometry and the common image degradations. In order to make the descriptor scale and rotation invariant, a scale-normalized image neighborhood is selected and its primary orientation is determined and applied to rotate the image around the keypoint to bring it in alignment. Multiple descriptors may be generated from a single keypoint in cases when there are multiple possible primary orientations of similar likelihood.

(3) Finally, at query time the descriptor vectors of the query image are compared with the descriptor vectors of all the various images in the collection to determine a possible match. The matching is usually based on a distance measure between two feature vectors such as the L1 or L2(Euclidean) distance. In many cases it is not possible to obtain the exact same keypoint order for the two images (for example, when the two images are arbitrarily rotated with respect to each other). Thus all the possible descriptor pair combinations need to be compared unless additional sorting and indexing of descriptors is applied. Depending on the desired sensitivity, a typical image may give rise to thousands of keypoints (and descriptors). It is therefore desirable to minimize the descriptor dimensionality (the number of features) since the descriptor dimensionality directly impacts the performance (the time it takes to compute distances).

As mentioned, a wide choice of keypoint identification techniques already exists in the literature. An even wider variety of descriptors have been proposed, based on various approaches, including: Gaussian derivatives, moments, complex features, steerable filters, and phase features, among others. One particular class of feature descriptors introduced by D. Lowe in the *International Journal of Computer Vision*, Vol. 60, No. 2, pp. 91-110, 2004 article has been demonstrated to outperform most others in terms of accuracy and speed. This class of descriptors (i.e., SIFT descriptors) is based on the distribution of local small-scale features within the keypoint neighborhood. The SIFT descriptor computes a histogram of the local spatial intensity gradients at 8 different orientations in a 4×4 grid around the keypoint and stores the result in a 128-dimensional vector.

Among all the available methods, the SIFT descriptor seems to be the most widely used. It offers a distinct descriptor that is relatively fast to compute for matching a modest number of images. However, the high dimensionality of the SIFT descriptor makes it impractical for use in real time applications involving large image collections.

Other shortcomings of the SIFT method and its variants include:

(1) Floating point descriptors: Each SIFT descriptor is a 128-element floating-point feature vector that captures a substantial amount of local intensity gradients and orientations in a region around the current keypoint. Depending on the desired detection sensitivity, a typical image may give rise to thousands of keypoints, some of which generating multiple descriptors (for example, when there are multiple primary orientations). This leads to a large amount of information that must be stored in memory for image matching, which can quickly overwhelm the system even for modest image collection sizes. Ideally, it is preferable to have a discrete measure (easily quantizable and of small finite-range) instead of a full floating point range.

(2) Time-consuming orientation histogram: The SIFT method does not use rotation-invariant measures. Instead, the SIFT method relies on the assignment of a consistent primary orientation to each image keypoint. The SIFT method achieves invariance to image rotation by taking the local descriptor intensity gradients relative to the particular keypoint orientation. However, the SIFT orientation assignment process is complex and time consuming. The scale of the keypoint is used to select the Gaussian-smoothed image at the closest scale, so that all computations are done in a scale-invariant manner. For each image sample at this scale, the 2D gradient magnitude and orientation are computed from pixel differences. An orientation histogram is created from the gradient orientations of sample points in a circular region around the keypoint. The orientation histogram has 36 bins covering the 360 degree range. Each histogram sample point is further weighted by a Gaussian-smoothing circular window of a standard deviation 1.5 times the keypoint scale. Peaks in the orientation histogram correspond to dominant directions of the local gradients. The highest histogram peak is detected and its orientation is used for determining the keypoint orientation provided no other local histogram peak is within 80% of the highest peak. A parabola is fit to the three histogram values closest to the peak in order to interpolate the peak position for better accuracy, and the resulting output is assigned to be the final keypoint orientation.

(3) Multiple keypoint orientations: Some keypoints occasionally have multiple peaks in the orientation histogram. Any additional local peak that is within 80% the magnitude of the highest peak is also used to create another possible orientation for the same keypoint. Therefore for keypoints that give rise to multiple histogram peaks of similar magnitude, there will be multiple keypoint orientations, created at the same location and scale but with different orientations. According to the literature, only about 15% of the keypoints are assigned multiple orientations, but this contributes significantly to the matching stability. However, the existence of multiple keypoint orientations increases the amount of descriptor information that has to be stored per keypoint. In addition, it slows down the performance by requiring multiple matching per keypoint.

(4) High dimensionality of SIFT descriptor: The SIFT descriptor is created by sampling the gradient magnitude and orientation around the keypoint, using the scale to select the level of Gaussian blur for the image and rotating the descriptor coordinates relative to the keypoint orientation. A Gaussian weight of a standard deviation 1.5 times the width of the descriptor window is applied to stabilize the descriptor against small changes in window position. The samples are accumulated by summing the content over 4×4 sub-regions, using 8 directions for each orientation histogram. A tri-linear interpolation is used to distribute each sample into adjacent histogram bins. The resulting SIFT descriptor is formed by concatenating the normalized values of all orientation histograms in a 4×4 grid (of 4×4 sub-regions each) around the keypoint into a single 4×4×8=128 floating point element vector. The high dimensionality of the SIFT descriptor has a direct impact on the matching performance due to the need to calculate distances to candidate descriptors in high dimensional space. Thus the matching performance quickly deteriorates as the number of images in the collection increases.

(5) Non compact descriptor storage: The SIFT descriptor is made more distinctive by recording the values of many local gradient magnitudes and orientations around the keypoint. No attempt is made to minimize the information content of the descriptor. The descriptors are typically stored in memory for future image matching. With thousands of keypoints in a typical image, each giving rise to one or more 128-element feature descriptors, the amount of overall information that needs to be stored in memory quickly becomes impractical for even modest image collection sizes.

(6) Poor matching performance for large image collections: The combination of: the high dimensionality of the SIFT descriptor in item (4) above in conjunction with the large amount of descriptor information per item (5) above limit the applicability of the existing method for large image collection sizes due to slow matching performance and increasingly larger amount of memory required.

Incorporation by Reference

The disclosures of U.S. patent application Ser. No. 12/147,624, filed Jun. 27, 2008 for "Method And System For Finding A Document Image In A Document Collection Using Localized Two-Dimensional Visual Fingerprints", by Doron Kletter et al.; and U.S. patent application Ser. No. 12/147,867, filed Jun. 27, 2008 for "System And Method For Finding Stable Keypoints In A Picture Image Using Localized Scale Space Properties", by Doron Kletter, are each hereby incorporated herein in their entireties.

BRIEF DESCRIPTION

An image management method and system provides for storing, indexing, searching and/or retrieving image data. The content of an image collection is pre-processed to identify stable and repeatable keypoints for each image in the collection. Fingerprint information is computed from local groups of keypoints, and the resulting fingerprint information is stored in a compact fingerprint database. The computing of the fingerprint information is based on combinations of a subgroup of the strongest keypoints in an image, called anchor keypoints, in addition to a number of non-anchor keypoints. For each fingerprint in the compact fingerprint database, a sequence of candidate fingerprint combinations is generated and stored in a Fan Tree and/or hashtable and a corresponding fingerprint data structure. The sequence of fingerprint combinations allows several non-anchor keypoints to be missing, while still allowing the system and method to correctly detect fingerprints with high accuracy. A realtime image query is performed by identifying keypoints and computing fingerprints from the query image and matching the query fingerprints to the existing Fan Tree and/or hashtable fingerprint data to determine the best matching image or set of images within the collection. At least one target image is retrieved based on the determining operation, and the retrieved target image is displayed, printed, stored and/or transmitted.

BRIEF DESCRIPTION OF THE DRAWINGS

FIG. 9 is an illustration of the unpacked Fingerprint Data content.

DETAILED DESCRIPTION

Figure 1:
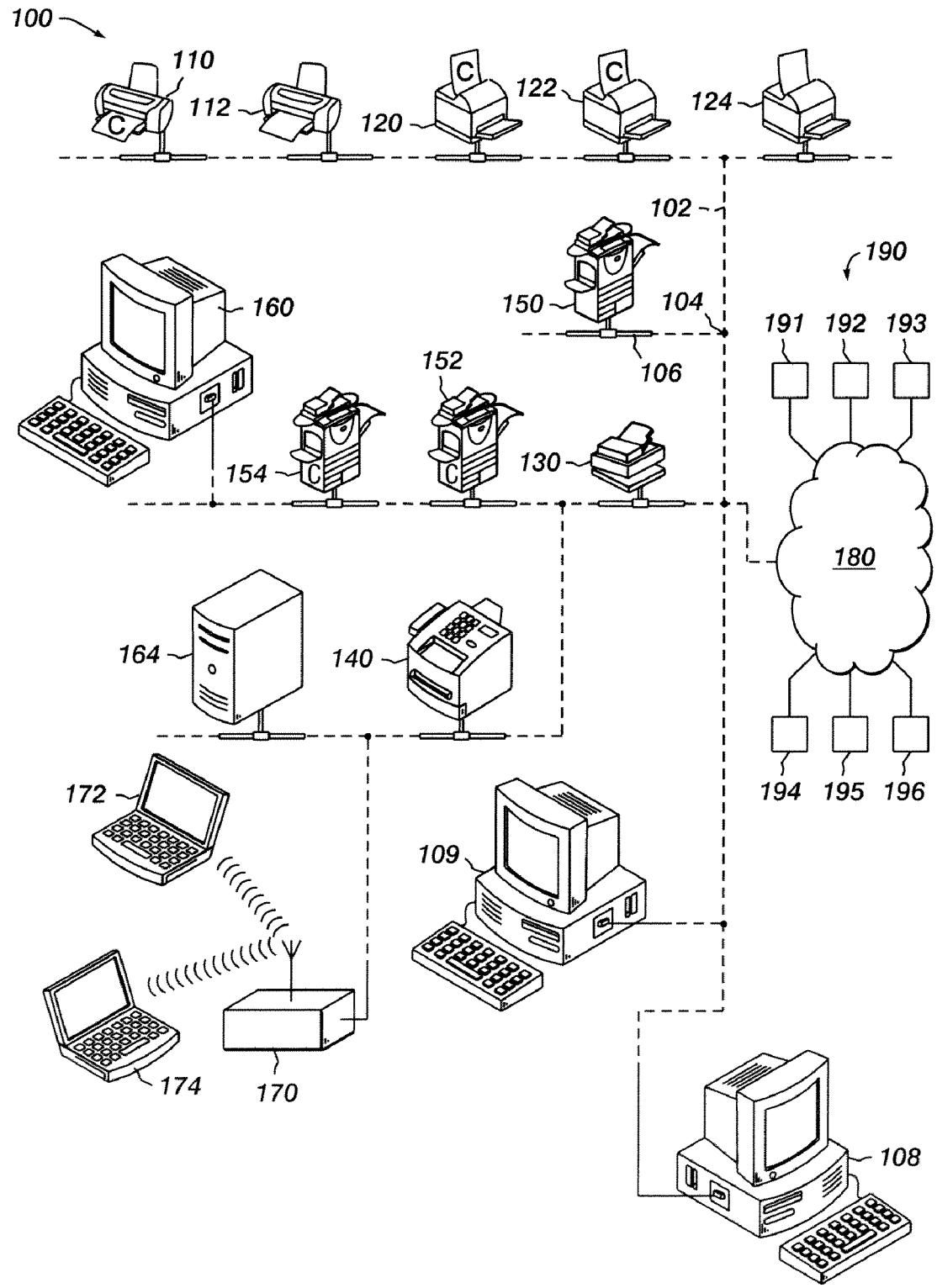
FIG. 1 sets out an environment in which the concepts of the present application may be implemented.

The system and method as described herein may work within the parameters of a computer network as illustrated in FIG. 1. The computer network 100 may be comprised of a series of wires 102, many of which may branch or join with a third wire 106 at a wire junctions 104, may connect a standalone peripheral device or pass through a peripheral to connect to other devices, such as computers 108, 109, wherein a computer may be considered a peripheral device. The network may incorporate a color printer 110 or other than color printer 112 as well as at least a color laser printer 120, 122 or one other than color laser printer 124. The network may also incorporate a scanner 130, or a fax machine 140, a photocopier 150, a color photocopier 152, or a combination color printer/scanner/fax machine 154. The network may also contain a personal computer and/or standalone computer terminal 160, or a standalone hard drive data storage medium 164. The network may also contain a wireless network transmitter receiver 170 and interface with at least one laptop computer 172, or a plurality of laptop computers 174. The network may also interconnect with any form of network 180 including but not limited to the Internet, an Intranet or other communication network. Through use of an interface with another form of network, the present system and method may interface with a plurality of peripheral data capturing devices 190 including, but not limited to a digital still camera 191, a digital video camera 192, a cellular telephone 193, a scanner 194, a personal data assistant 195, or a document indexing system 196. It is to be understood the present concepts may be implemented in networks having various combinations of the above components, going from a network having a single device to one which includes thousands or more connected devices. Further, various ones of the above components may have memory storage areas arranged in any of a number of known configurations which may be useful in implementing the concepts to be described. The storage areas may be RAM, ROM, Flash Memory or other memory types which can hold software incorporating the concepts of the present application. Other memory storage areas may be configured to hold various digital images in any of a number of database formats.

Still further various ones of the components of FIG. 1, such as but not limited to the computers, include processors to process instructions from software loaded on or otherwise accessible by the components. It is to be understood various ones of the components having the processors may have more than one processor whereby processing of the instructions can be divided among the multiple processors. Alternatively, a single processor can operate to divide the instructions, whereby processing can occur in a multi-threaded environment.

In this application an alternative method and system is developed that entirely eliminates the need for descriptors which, as described above, are used in existing methods and systems. Instead, the method and system of the present application uses localized two-dimensional fingerprints that are directly computed from the keypoint locations. The fingerprints are far more compact than descriptors, and they are just as effective in identifying a corresponding keypoint. In contrast to descriptors, fingerprints scale readily to very large image collection sizes. In addition, the fingerprints are designed to be invariant to rotations and affine transformations and thus require no special orientation processing as in SIFT.

The method of generating 2D fingerprints is an extension of a technique also disclosed in U.S. patent application Ser. No. 12/147,624, filed Jun. 27, 2008, entitled Method And system For Finding A Document Image In A Document Collection Using Localized Two-Dimensional Visual Fingerprints, by Doron Kletter et al. The to-be-described advanced mixed anchor fingerprinting method is suitable for effective application with either hashing or Fan Tree-based implementations.

The use of fingerprints for the purpose of finding a similar picture or picture set in a picture collection is composed of the following two steps:

1. At a preprocessing stage, a corpus of target pictures is analyzed to extract the several hundred most distinctive fingerprints from each image. For a very large corpus of images, with low probability a given fingerprint may be found in multiple target pictures. The fingerprints are of high dimension (approx. 35). They are hashed into a hashtable, whose entries contain lists of linked fingerprint records. Or alternatively, a Fan Tree can be constructed and the fingerprints indexed into it. Each fingerprint record contains the identity of a particular fingerprint, its value (the fingerprint string), and the identity of a target picture containing that fingerprint. The fingerprint value is only needed in the case of hashtable collisions, when such are permitted, in order to distinguish between different fingerprints that may be hashed into the same hashtable entry. Collisions may occur as a result of limiting the hashtable size in memory.

2. At query time, fingerprints are extracted from the query image. Sequentially, each fingerprint is used as a key for looking up the Fan Tree or hashtable content, to retrieve relevant candidate fingerprint records of target pictures. For each such fingerprint record, because of potential Fan Tree or hashtable collisions, the query fingerprint string is compared with the target picture fingerprint string. If there is an exact match with a particular target picture fingerprint string, a vote count for that target image is incremented. The expectation is that many votes will accrue for correct matches between the query and candidate target picture, and few votes will accrue for incorrect matches resulting from coincidental matching of a small number of fingerprints.

Figure 2A:
FIGS. 2A-2C represent an application of a stable keypoint identification operation using a system and method according to the present application for a screen-displayed query camera image shown in FIG. 2A, and the keypoint identified locations of the screen-displayed query camera image shown in FIG. 2B, and of a corresponding target image 2C, wherein the corresponding keypoint locations are detected in three scales, with the smallest-scale locations marked with "+", intermediate-scale locations with "□", and largest scale locations with "○".
Figure 2B:
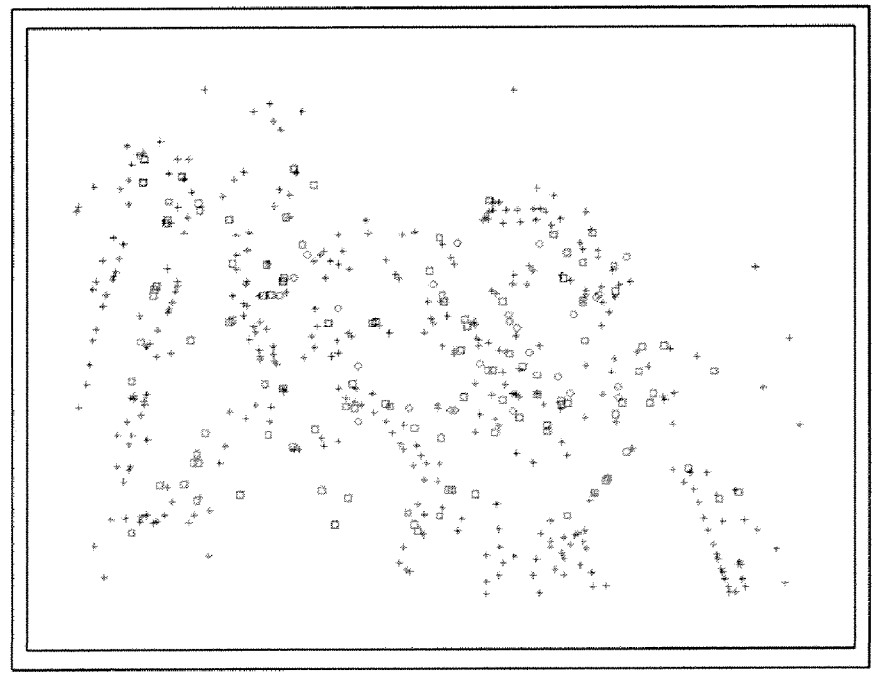
Figure 2C:
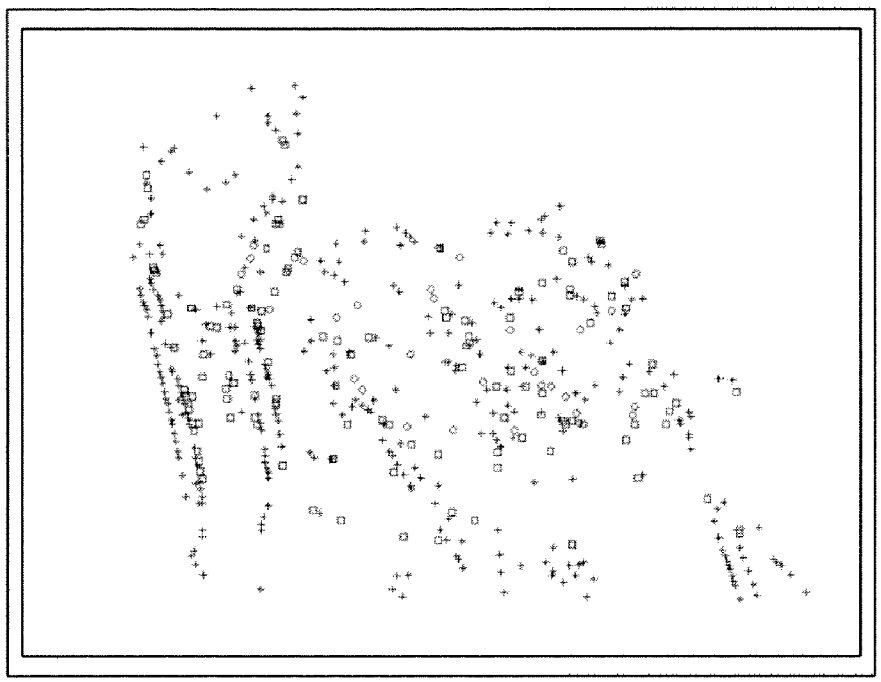

Turning now to FIGS. 2A-2D, illustrated is a successful image query search using the method and system of the present application. Initially, as shown in FIG. 2A, a query image is captured by a camera scanner or other such device or is reproduced from a stored electronic version of a target image, such as the image of FIG. 2D. The partial obstruction of a hand in FIG. 2A is intended to emphasize the concepts of the present application may be accomplished even in situations where the query image is in some manner degraded, including situations where a portion of the query image is partially occluded by other objects. The query image is processed to identify stable keypoint locations in scale space domain as documented in U.S. patent application Ser. No. 12/147,867, filed Jun. 27, 2008, entitled, System And Method For Finding Stable Keypoints In A Picture Image Using Localized Scale Space Properties, by Doron Kletter. Resulting query keypoint locations are shown in FIG. 2B. A set of query fingerprints is computed from the query image keypoint locations and matched against a database of fingerprints from an image collection. FIG. 2C shows the keypoints found for the target image in the picture collection.

Figure 2D:
FIG. 2D represents a target image.

More particularly, keypoint locations obtained by operation of the system and method of the present application to the image of FIG. 2A are illustrated in FIG. 2B. The obtained keypoint locations in the three scales are shown with the smallest-scale locations marked with "×", intermediate-scale locations with "□", and largest-scale locations with "○". Where smallest-scale locations are identified by use of smallest sized filters, the intermediate-scale locations are identified by use of a scaled-up version of the smallest sized filters, and largest-scale locations are identified by use of largest sized filters. Likewise, keypoint locations obtained by operation of the system and method of the present application on the target image of FIG. 2D are illustrated in FIG. 2C. Therefore, FIGS. 2B and 2C illustrate the results of the operation of the system and method of the present application, which will be disclosed in more detail below.

Figure 3A:
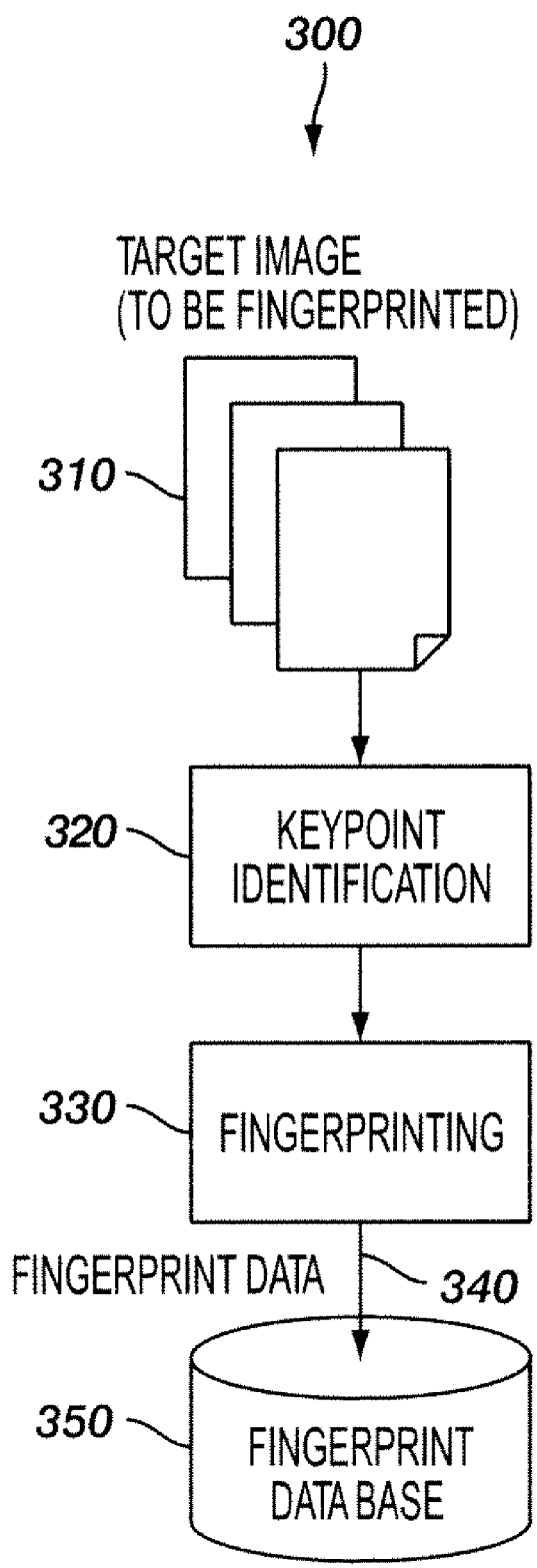
FIGS. 3A-3B show an overview of method of document collection preparation for finding documents using 2D Visual Fingerprints.
Figure 3B:
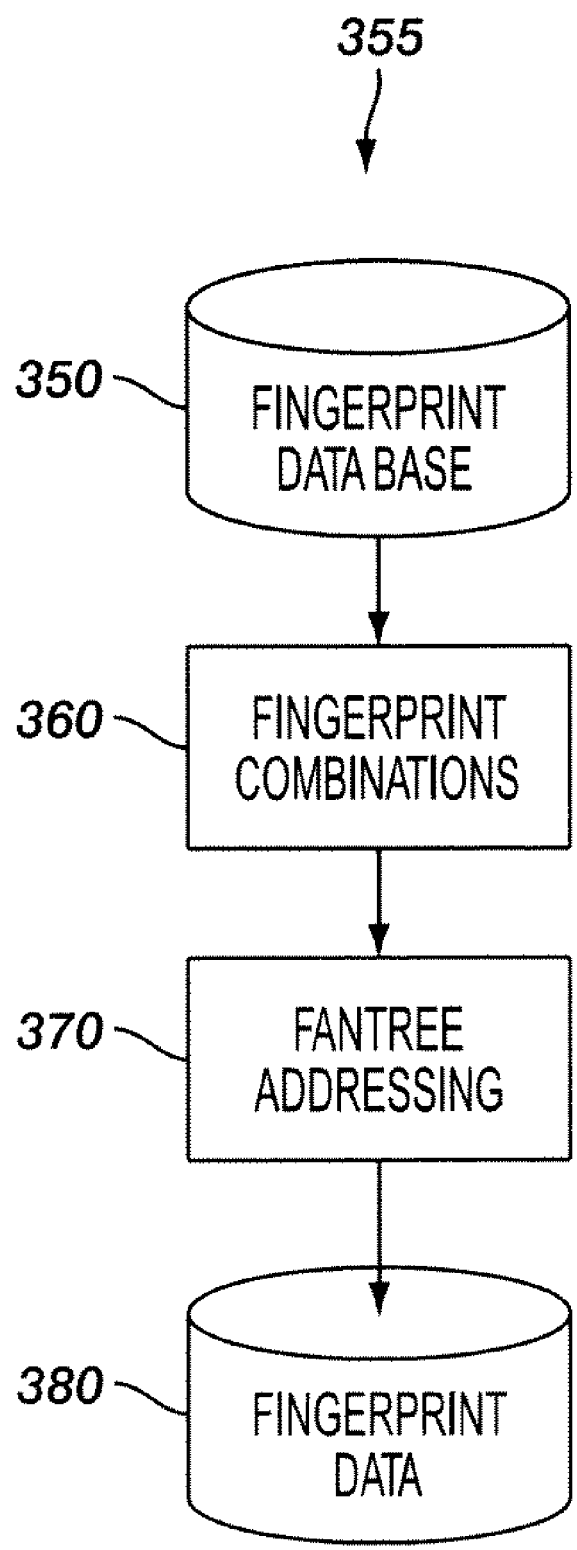
Figure 4:
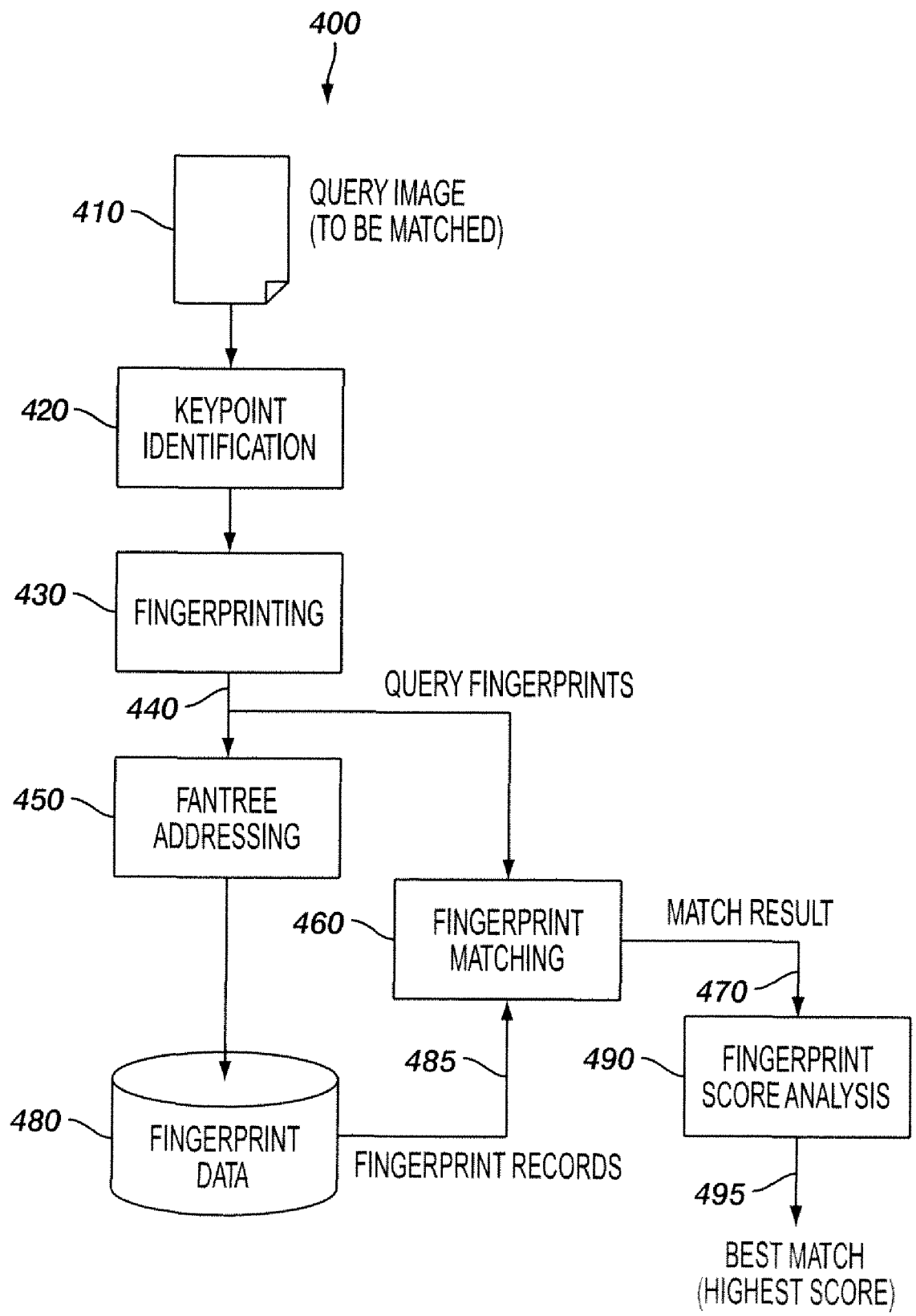
FIG. 4 illustrates continued query operation for finding documents using 2D Visual Fingerprints.

The method of this application is composed of three processing steps as outlined in FIGS. 3A-3B and 4. It is to be appreciated, FIGS. 3A-3B and 4 present an overview of the present system and method, and the concepts introduced in these figures will be explained in greater detail in the sections which follow.

(a) In a flow diagram 300 of FIG. 3A, the content of a picture collection is pre-processed to identify stable and repeatable keypoints. For each picture in the collection of target pictures 310, keypoints are identified 320, and for each keypoint, a fingerprint is computed by performing fingerprinting operations 330. The resulting fingerprint data information 340 is stored in a compact fingerprint database 350.

Since it is in general more difficult to find stable keypoints in a continuous tone pictorial image than in a text or line art document, the present application details a fingerprinting method that is based on combinations of a small number of the strongest keypoints in an image —called anchor keypoints—in addition to a number of other (non anchor) local keypoints. Due to their strength, the anchor keypoints are likely to be found with high probability in both query and target images. The use of anchor points helps to considerably reduce the overall number of fingerprint combinations by "grouping" together the weaker local keypoints in conjunction with a few stronger anchor keypoints in the neighborhood.

(b) Next, FIG. 3B provides a flow diagram 355 used to organize the fingerprint database 350. In this process, information having various fingerprint combinations 360 is organized in a Fan Tree in accordance with the Fan Tree Addressing method 370 of U.S. patent application Ser. No. 12/147,624 (incorporated herein by reference). For each input fingerprint in the Fingerprint Database 350, a sequence of candidate Fingerprint Combinations 360 is generated and stored in the Fan Tree 370 and corresponding Fingerprint Data structure 380, in order to facilitate fast and efficient fingerprint matching. The purpose of the sequence of fingerprint combinations is to allow several (non-anchor) keypoints to be missing due to a possible transformation such as affine or perspective transformation of the query image and still be able to correctly detect the fingerprint with high accuracy.

(c) FIG. 4 illustrates performing a realtime image query 400 for a particular query image 410, by identifying keypoint locations 420 in the particular query image 410 and computing fingerprint information 430 for each query keypoint from local groups of query keypoints, matching the query fingerprints 440 to the existing Fan Tree fingerprint data 480 to determine the best matching image or set of images within the collection. Each query fingerprint is used to calculate a Fan Tree address 450 which leads to a particular Fan Tree Leaf node list, containing a subset of the original image collection fingerprint records 485. Each original fingerprint from the subset list is in turn sequentially compared with the current query for fingerprint matching 460. Each time the query fingerprint matches one of the retrieved fingerprint records, a count of the number of matching fingerprints for that image is incremented. In addition, a score is assigned to each fingerprint match based on the fingerprint strength and how uniquely it correlates with the target fingerprints. Finally, a Fingerprint score analysis module 490 examines the resulting accumulated scores and counts of matching fingerprints 470 for each image to determine the best matching image or set of images 495 within the collection that best matches the query image 410. An overall score is calculated for each matching document by combining the number of fingerprint matches and their relative scores. Depending on the application, the Fingerprint score analysis module 490; may select a single document with the highest overall score, or it may alternatively select all documents having an overall score higher than a given value. The matching document set can then be retrieved and printed out, electronically transmitted, displayed and/or stored, by one of the components of FIG. 1.

I.a. Image Collection Pre-Processing

Figure 5:
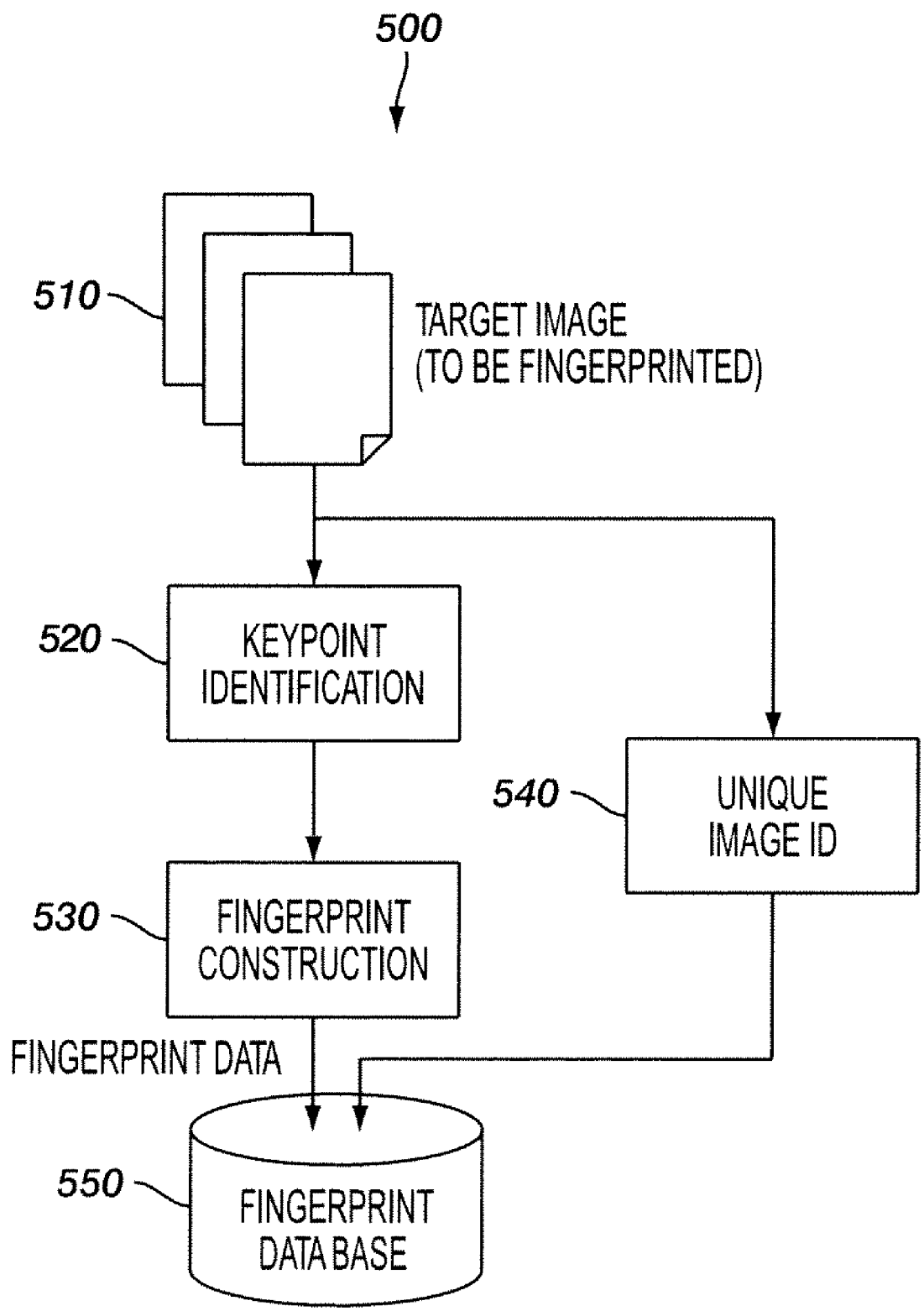
FIG. 5 is a method of generating a finger-print data base for a document collection.

An image collection pre-processing flow diagram 500 is shown in FIG. 5. In this flow diagram target images 510 are processed sequentially, one at a time, to extract their visual fingerprint information, based on keypoint identification.

In a keypoint identification processing module/step 520, each target image 510 is processed to identify a set of keypoints based on the input image content. The success of the method depends on its ability to find nearly the same keypoints in clean target images and in degraded versions of the images under certain common distortions and varying illumination conditions. The output of the keypoint identification module 520 is a list of keypoints and their associated attributes such as scale, location on page, and relative strength.

Next, in fingerprint construction processing step 530 fingerprints are calculated from small groups of keypoints in local neighborhoods. The use of localized fingerprints contributes greatly to the flexibility and robustness of the method, particularly in terms of relaxing camera image geometry and overall illumination requirements. The resulting fingerprints are stored in the Fingerprint Database 550 where each image will have a unique image ID 540 corresponding to the target images 510.

I.a.1 Detection of Image Keypoints

A goal of the keypoint identification module (e.g., 520 of FIG. 5) is to identify stable keypoints in a continuous-tone picture image which are likely to be found repeatedly and reliably even in a degraded image that is subject to noise, scene lighting variations, and common distortions such as skew, warp, rotation, translation, scale, change of resolution and the like.

A particular method of identifying stable keypoints in an image has been also described in detail in U.S. patent application Ser. No. 12/147,867.

This method constructs a scale space pyramid representation of the input image at multiple scales. At each scale, a set of specific filters is applied to the input image, where each successive filter is a scaled up version of the previous filter. The filter outputs are combined together to form a single function $D(x,y,s)$ of scale and space. Stable keypoint locations are identified in each scale as the pixel locations at which the function $D(x,y,s)$ attains a local peak value (either a maximum or a minimum) in the scale space neighborhood.

In one embodiment of this application all the available keypoints identified in the input image are used. In another embodiment, the available keypoints are sorted by relative strength and other considerations such as the keypoint scale and/or proximity to other keypoints, and selecting only a fixed number of the best keypoints to output. In yet a third embodiment, the input image area 510 may be sub-divided into a set of (overlapping or non-overlapping) regions, and a number of preferred keypoints are selected from each region to prevent one region from dominating all others.

Finally, the last processing step of the keypoint identification module 520 includes a validation step to ensure that no two keypoints shall have the exact same location within a given tolerance level. The validation step removes any duplicate location keypoints by retaining only the strongest most desirable keypoint (depending on its strength, scale, and/or proximity to other keypoints) at this location and eliminating any other same-location keypoints. The list of remaining keypoints at the output of the keypoint identification module 520 becomes the final candidate keypoints list.

The overall number of keypoints that can be identified in an image depends of course on the input image content and the choice of the keypoint identification parameters such as the keypoint strength threshold, etc. There can be anywhere from several hundreds to thousands of keypoints in a typical natural scene image.

Figure 6:
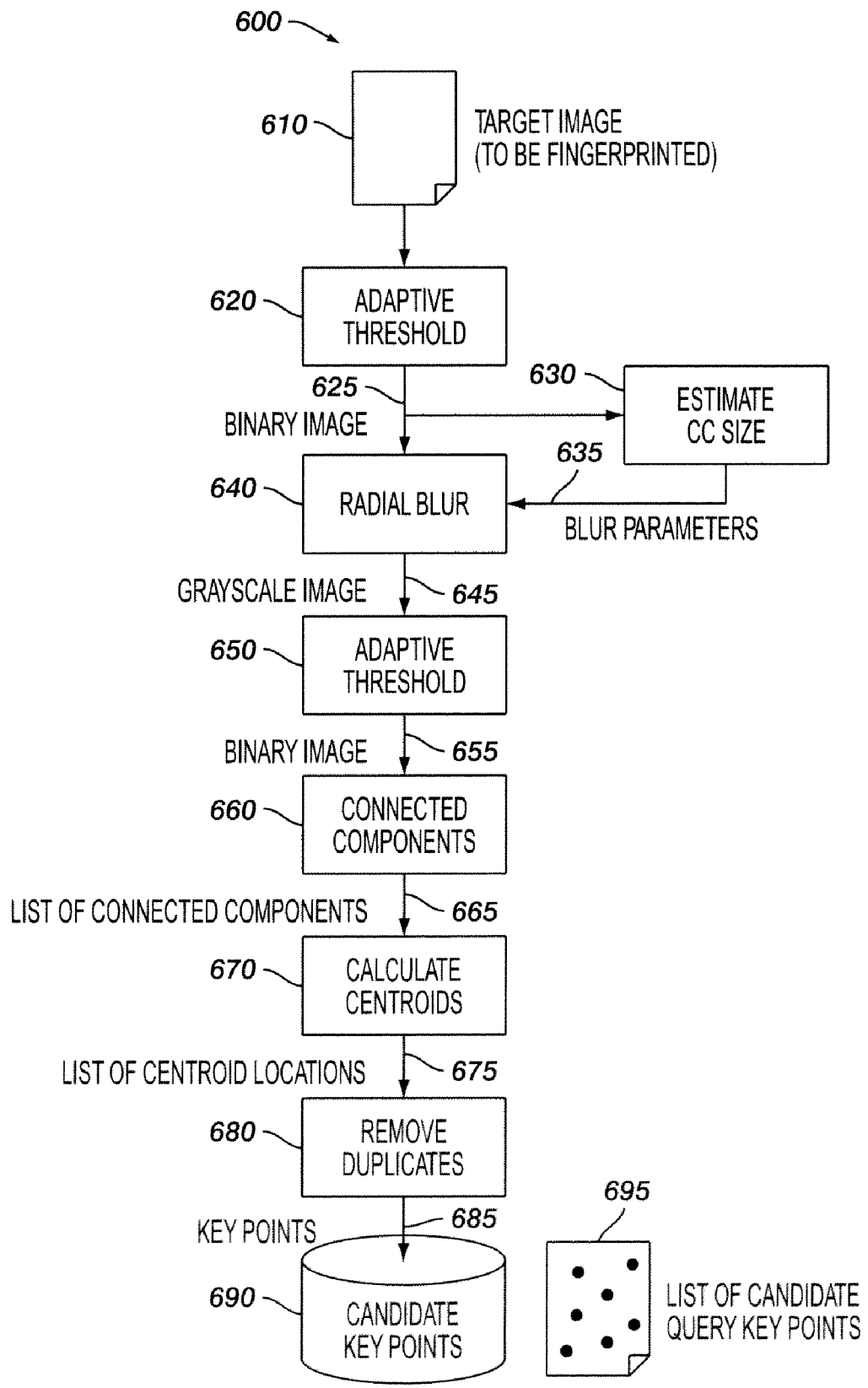
FIG. 6 is a method of identifying Candidate Keypoints in target documents.

Turning now to FIG. 6, a process of detecting document keypoint locations 600 of a target image 610 is shown. Image processing of adaptive thresholding, blurring, and connected component collection are well known in the literature. For best results, it is desirable to perform the keypoint identification process in a perceptual image space in accordance with the properties of the human vision system.

A binary output image 625 of a first Adaptive Threshold module 620 is sent to an Estimate CC Size module 630. The term CC here stands for Connected Component, which is a maximally connected sub-group of binary pixels having the same polarity. Two pixels are in the same connected component if and only if there exists a path of the same polarity pixels between them. The purpose of the Estimate CC Size module 630 is to dynamically estimate, for the target image 610 on an image by image basis, the blur parameters 635 such as blur filter size to be applied in the subsequent Radial Blur module 640. The objective of the blurring process is to provide robust, reliable, and repeatable keypoint identification. The blurring also helps to remove noise such salt and pepper noise and eliminate small isolated features on the page. The shape of the blurring filter, for example but not limited to an approximated Gaussian shape, should be smooth enough to prevent from introducing undesirable artifacts.

One issue in determining the right amount of blurring is that the size of a typical text character on the input page is not known in advance. One embodiment of the present application discloses the Radial Blur parameters 635 fixed and predetermined in advance to provide a good compromise across a range of standard type formats such as for 10 to 14 point Roman fonts. In a second embodiment of the present application, the Radial Blur parameters 635 are made selectable such that the user may specify the optimum setting to apply on a document by document basis. In either one of these embodiments, the Estimate CC module 630 is not used, and its output is replaced by the selected predefined Radial Blur parameters 635.

In a third embodiment of the present application, the Estimate CC module 630 is used to automatically estimate the optimum Radial Blur parameters by examining the Input target image 610 content. In this case, the Estimate CC module 630 uses the binary output 625 from the Adaptive Threshold 620 module. The Estimate CC module 630 processes the binary image 625 to gather connected-component elements, and proceeds to histogram the connected-component height, because character height is less variable and more indicative of the font size than character width in most Roman languages. The height histogram is used to determine the appropriate Radial Blur parameters based on the frequency of occurrence. During the process, the Estimate CC module 630 takes care to eliminate noise-induced connected-components such as when the dimensions are too small (e.g., comprised of a few isolated pixels), or the dimensions are too large (e.g., when a long line or a frame is encountered around the page), so that the estimate provided is not biased by a few unusually large or unusually small connected component elements. In addition, since pages may contain a mixed assortment of font sizes, the Estimate CC algorithm has been designed to provide a conservative estimate with good compromise even in the case of a mixed font set.

In a fourth embodiment of the present application, the Estimate CC Size module 630 may dynamically provide adaptable blurring parameters based on analyzing the Input image content in localized sub-image regions and adaptively varying the blurring parameters from one region to the next; For example, when dynamically moving from one image area containing primarily small point text to another nearby area containing larger fonts.

The output of the Radial Blurring module 640 is a grayscale image 645. The Adaptive Threshold module 650 converts the grayscale Radial Blur 640 image output 645 to binary black and white output 655 by adaptive thresholding 650.

The binary output of the second Adaptive Threshold module 650 is a binary image 655 and is forwarded to the Connected Component module 660. Connected component methods are well known in the art, and may be considered a set of maximally connected components of a graph.

In a first embodiment of the present application, all the available connected components are used. In a second embodiment, the available connected components are sorted by relative strength, for example, giving weight to optimum of the connected component dimensions, pixel count, aspect ratio, and/or proximity to other connected components, and only the smaller subset of connected components are outputted. In a third embodiment, the input target image 610 may be sub-divided into a set of overlapping or non-overlapping regions, and a number of connected components selected from each region to prevent one region from dominating all others.

The Calculate Centroid module 670 determines the visual center of each connected component at the output of the Connected Component module 660. For each connected component, the horizontal centroid location is calculated by summing together the horizontal coordinates of each member pixel of the connected component and dividing the outcome by the total number of member pixels. The vertical centroid location is likewise calculated by summing together the vertical coordinates of each member pixel and dividing by the number of member pixels. The summation can be effectively done on-the-fly during the connected component analysis. Note that only the pixel members of a given connected component contribute to its centroid location, ignoring any other non-member pixel "holes". The visual centroid of each connected component is calculated with subpixel precision, since in many languages the connected components tend to be situated in text lines.

In the last processing step of the keypoint identification phase, the list of connected component centroid locations 675 from the Calculate Centroid module 670 is validated by the Remove Duplicates module 680, which produces a list of keypoints 685. The purpose of the validation is to ensure that no two connected component shall have the same centroid locations within a given tolerance level. Duplicated connected components with nearly the same centroid locations are eliminated.

The list of remaining connected component centroids at the output of the Remove Duplicates module 680 becomes the final candidate query keypoints list 695. The overall number of candidate keypoints 690 depends on the Input image content and the type of connected component processing. There can be several hundred keypoints for a typical machine printed page.

I.a.2. Construction of Fingerprints

This section describes the process of computing fingerprints from local groups of keypoints and packing the fingerprints for efficient storage in the Fingerprint Database (e.g., 550 to FIG. 5). The fingerprints are packed in order to reduce the Fingerprint Database size and storage requirements.

Identification of robust 2D visual fingerprints is sought in the input image that will be stable across a wide range of noise, viewing conditions, and image distortions. In addition, it is useful to minimize the fingerprint size in order to enable the system to scale up effectively to handle very large image collection sizes (e.g., containing millions of images), since the fingerprint database consists of all the valid fingerprints in the collection. At the same time, the fingerprints are designed to identify the individual image signature they represent with high accuracy and confidence.

The concept of using fingerprints for machine printed documents based on word centroids has been also described, for example, in U.S. patent application Ser. No. 12/147,624. Fingerprints are constructed as sequences of quantized, transformation-invariant 2D ratios, called persistent ratios, which are derived from the relative 2D positions of a given keypoint and its (N−1) nearest-neighbor keypoints. Thus each fingerprint is localized to a small image neighborhood around the keypoint of interest. A fingerprint sequence is dependent only on the relative 2D geometry between the keypoint of interest and its (N−1) closest keypoint neighbors. The number of neighbors N is a design parameter that influences the fingerprint strength.

In the present application the fingerprinting method also described in U.S. patent application Ser. No. 12/147,624 is extended to the case of continuous tone images. Unlike the case of machine printed documents where certain word-centroid features are utilized to identify robust keypoint in binary images, it is considerably more difficult to find stable keypoints in continuous tone pictorial images. Thus greater variability is to be expected with the keypoints found in continuous tone images relative to the keypoints found in machine printed documents.

The typical problem with continuous tone images is the pair-wise matching of keypoints between two images. In machine printed documents, the word centroids are highly robust to noise and image distortions, and are likely to appear with high probability in both images. In contrast, some of the salient scale space keypoints in continuous tone images, particularly the weaker ones, may not be as distinctive.

In result, the typical situation with continuous tone images is that while most of the keypoints can be commonly found with high probability in both the query and target images, there may occasionally be a few missing or extra keypoints in the query image that have no corresponding matching keypoints in the target image. A missing keypoint is a keypoint found in the target image but not in the query image. Likewise, an extra keypoint is a keypoint found in the query image but not in the target image.

The presence of a variable number of missing or extra keypoints between the query and target images can quickly deteriorate the fingerprint matching results. Furthermore, due to the multiplicity factor, extra or missing keypoints are likely to impact more than one fingerprint since a given keypoint is typically involved in a number of local fingerprint combinations.

Therefore, presented is a new fingerprinting method that is based on specific combinations of a small number of the strongest keypoints in an image—called anchor keypoints—in addition to the other (non anchor) local keypoints. Due to their strength, the anchor keypoints are likely to be found with high probability in both query and target images. The use of anchor points helps to considerably reduce the overall number of fingerprint combinations by "grouping" together the weaker local keypoints in conjunction with a few stronger anchor keypoints in the neighborhood. The anchor keypoints are selected from the list of candidate keypoints based on their relative strength and distance to other anchor keypoints. The algorithm uses a clustering technique to group same or smaller strength keypoints together based on their distance and retain only the strongest group keypoint as a group representative. The algorithm iterates until there are no further keypoints to merge into groups and/or the change in intra-group distance from the previous iteration is below a given threshold. In addition, a minimum distance clustering parameter is used to obtain good anchor keypoint coverage of the image. The resulting group representatives (i.e., strongest keypoint in each group) are then selected as the set of anchor keypoints.

Fingerprints are constructed as sequences of quantized transformation-invariant 2D ratios called persistent ratios, which are derived from the relative 2D positions of a group of keypoints. In this embodiment, in order to make the fingerprints robust to missing or extra keypoints, the local group of keypoints used to construct a fingerprint is configured to include a small pre-determined number of anchor keypoints in addition to the local keypoints.

Thus the group of keypoints forming a fingerprint according to this application is composed of the given keypoint, a small number of anchor keypoints, and a set of other (non-anchor) local nearest-neighbor keypoints. The overall number of keypoints in a fingerprint and the ratio of the number of anchor-to-other keypoints are two system design parameters that influence the fingerprint strength and robustness.

Figure 7:
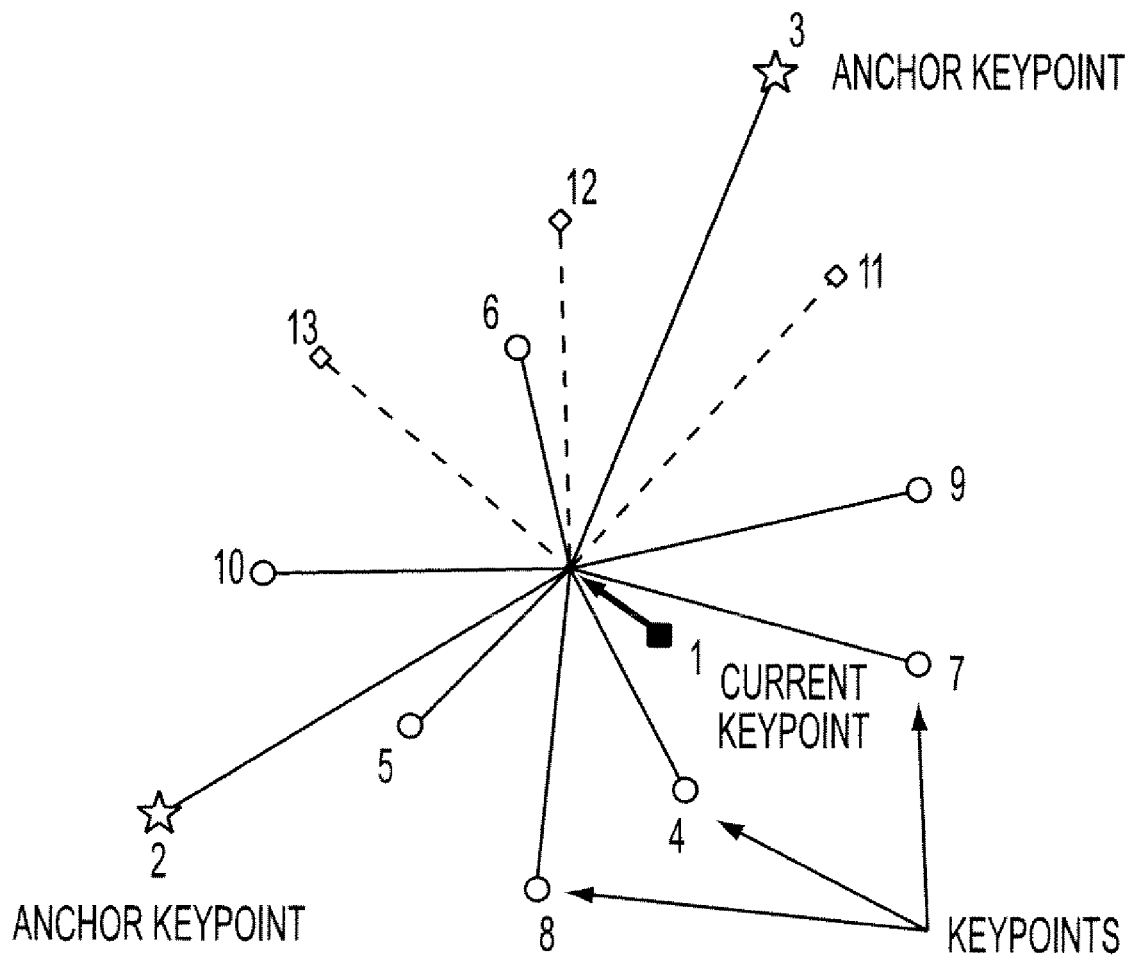
FIG. 7 is a method of identifying Candidate Anchor Keypoints in target images.

A particular method of computing a fingerprint from the combinations of anchor keypoints and other local keypoints is illustrated in FIG. 7. A fingerprint is computed for each candidate keypoint at the output of the keypoint identification module. The current keypoint location (1) for which the fingerprint is computed is shown at the center of FIG. 7 with a square pattern. The fingerprint is computed from the 2D locations of: (a) the current keypoint location (1); (b) a pre-determined number of the nearest anchor keypoints (2,3 indicated by star pattern in FIG. 7) to the current keypoint location; and (c) a number of the nearest-neighbor non-anchor keypoints (4 through 10, shown with circle pattern in FIG. 7). Additional non-anchor keypoints locations (such as 11 through 13, dotted line pattern in FIG. 7) are not included in the fingerprint since they are further away by a pre-determined distance from the current keypoint location (1).

Note that each fingerprint is localized to a small image neighborhood around the keypoint of interest by selecting the closest anchor as well as non-anchor keypoints relative to the given keypoint location (1). A particular aspect of the present embodiment lies in making the fingerprints robust to certain image distortions (such as skew, warp, rotation, translation, scale, change of resolution, etc.) that commonly occur during the process of scanning or taking a picture of the image with a digital or a cell phone camera or other image capturing device.

A method of computing a fingerprint from the 2D locations of a group of N keypoints is described in U.S. patent application Ser. No. 12/147,624. A difference from that described embodiment and the description in this application is that here some of the keypoints are further constrained to be anchor points instead of regular keypoints. For each group of P=4 keypoints {A, B, C, D}, comprised of a non co-linear combination of any anchor and/or non-anchor keypoints, the ratio of triangle areas (ABC/ACD) is calculated and quantized to Q-levels. The value of Q can be conveniently chosen to be a binary power of two. The quantization process is illustrated in FIGS. 8A-8B for the case of Q=8.

Figure 8A:
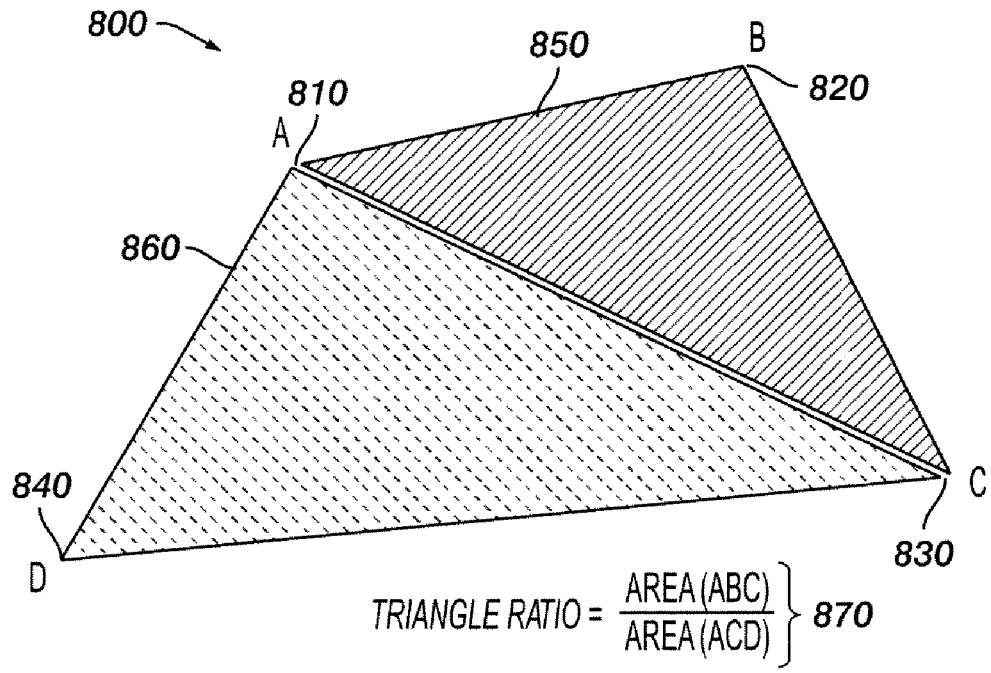
FIG. 8A illustrates the method of obtaining a Triangle Ratio for construction of Fingerprints.
Figure 8B:
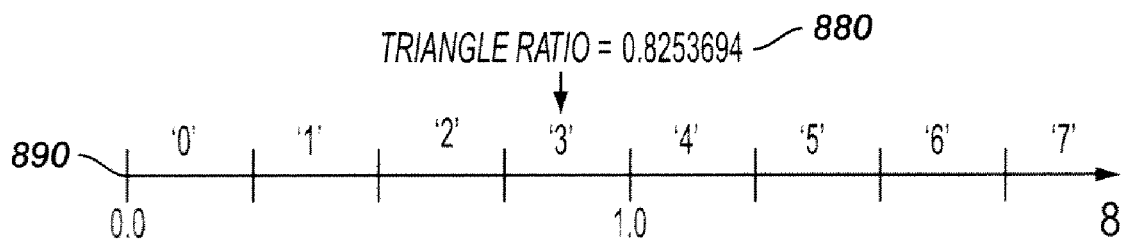
FIG. 8B is the Quantization Step of the Triangle Ratio of FIG. 8A.

As illustrated in FIG. 8A, It is well known in the art that for any given polygram 800 comprised of four non co-linear points {A, B, C, D} (i.e., 810, 820, 830, 840), on the object surface, comprising a triangle ABC 850 and a second triangle ACD 860, the ratio of triangle areas (ABC/ACD) 870 remains constant under any affine transformation. Hence only P=4 points are needed to calculate one triangle area ratio, illustrated as the Triangle Ratio 870. This affine transformation has been shown to provide an acceptable model for describing the camera to planar object geometry in many practical situations.

In another embodiment of the present application, for situations where a transformation order larger than affine is required to describe the image model, the transformation can be extended to handle perspective transformation using P=5 points (instead of 4) to calculate a single persistent ratio which is the product of two triangle ratios.

A single fingerprint is therefore comprised of a sequence of quantized persistent transformation ratios for a group of N nearest neighbor keypoints sorted in clockwise order. To keep the fingerprint size small, the transformation ratio 870 is quantized to Q-levels. In one embodiment, the value of Q can be conveniently chosen to be a binary power of two. In FIG. 8B, the quantization process is illustrated as the Quantization of the Triangle Ratio 870 of FIG. 8A for the case of Q=8. The valid range (0,∞) of a Triangle Ratio before quantization is divided into Q=8 intervals labeled '0' to '7' as shown in FIG. 8B (890). The interval boundaries are determined empirically to provide approximately uniform distribution of quantization labels over a large set of representative documents. The incoming triangle ratio value 880 is sequentially compared with increasing interval boundaries to determine the first higher or equal interval boundary, upon which the process is terminated and the corresponding label interval is assigned as the quantized result. For example, an incoming triangle ratio of 0.8253694, being less than 1.0 and higher than the previous interval boundary, is assigned a quantized value of '3'.

The advantage of using triangle area ratios is that their values remain constant (hence persistent) under affine transformation. The affine transformation has been shown to provide an acceptable model for describing the camera to planar object geometry in many practical situations.

One problem that may occur during the fingerprint matching is that the query image may be in a different orientation relative to the target image to be matched. When the query image is rotated relative to the target image, the resulting fingerprint sequence is unlikely to match the target sequence due to the different order of digits within the sequence, even though the two fingerprints share an identical set of digits. Two fingerprints will only match if there is a one-to-one match between each and every corresponding quantized ratio digits of the entire fingerprint sequence.

The particular sequence of quantized ratios of a given fingerprint depends on the particular ordering of its keypoint. For example, if the query image is rotated relative to the reference original, the starting keypoint may be different, leading to an entirely different sequence of quantized ratios. In order to determine a possible fingerprint match, the two fingerprints must first be put into the same sequence order of corresponding keypoints.

One approach to overcome the above problem is to generate all the possible fingerprint sequences that may potentially occur as a result of image rotation and register them in the Fan Tree as possible candidate fingerprints to match against. However, this approach is both inefficient, in having to check for multiple matches, and wasteful in having to store multiple versions of each candidate fingerprint in memory.

The SLCD method also described in U.S. patent application Ser. No. 12/147,624 provides a significant performance boost by substantially reducing the overall number of candidate fingerprints to be matched for each query fingerprint.

In a first step, a histogram of the fingerprint digit sequence is performed to determine the smallest least common quantization digit. Consider as an example the following single fingerprint sequence:
Fingerprint="14603616376756326322477662652206667"

The digits of the fingerprint sequence are counted to determine how many there are of each value type. For example, the above fingerprint has two '0' digits, two '1' digits, six '2' digits, four '3' digits, two '4' digit, and so on. The smallest least common digit is the smallest least frequent digit that appears at least once in the fingerprint sequence, that is, with the smallest non-zero count. In the above fingerprint example, the smallest least frequent digit is the digit '0', since no digit has a count of one, and there are at least three digits with a count of 2 in the fingerprint sequence ('0', '1' and '4'), and '0' is smaller than the other digits '1' or '4'. The priority is always given to a smaller count in order to minimize the number of permutations overall.

After determining the value of the smallest least common digit in the fingerprint sequence, the sequence is scanned to determine the positions of the smallest least common digit within the fingerprint sequence. For each position, the beginning portion of the sequence up to the location of the smallest least common digit is permuted to the end of the fingerprint sequence, while keeping the internal sequence of the beginning and end portions unchanged. Thus the number of permutations varies from one fingerprint to another. For each fingerprint sequence, the number of permutations is equal to the smallest least common digit count of the fingerprint. The advantage of the SLCD method is that it seeks to minimize the number of permutations per fingerprint at a good balanced computational load without requiring an exhaustive search throughout the space of all possible fingerprint sequence digit permutations.

For the sample fingerprint case above, the resulting permutations in accordance with the SLCD embodiment method include the following two candidate sequences: ʌ

Thus the query fingerprint will be sorted and matched against two candidate fingerprint permutations in this example. Each permutation is formed by shifting the original fingerprint sequence from the beginning up to the location of the smallest lease common digit ('0' in this case) to the end of the permuted fingerprint sequence. The '^' marker underneath the permutation sequence indicates the location of the end of the original fingerprint sequence for illustration purpose.

In the embodiment of the present application, the permutated fingerprint sequences are used instead of the original fingerprint sequences. The advantage of using the permutation is that it considerably reduces the number of candidate fingerprint sequences that need to be matched against. Rather than examining all the possible cyclic combinations of the original fingerprint sequence, only a few permutations of the smallest least common digit are investigated. The permutation are generated and stored in advance during the Fingerprint Data Base preparation. At query time, only the first permutation of the query fingerprint sequence is used for matching, and there is no need to check for additional query permutations since all permutations have been stored in advance and the correct one will be automatically found.

The use of permutations in accordance with embodiments of the present application provide a significant performance boost for a slight storage increase, since the number of permutations, on average, is much smaller than the original fingerprint sequence length.

Another aspect of this application is that several (typically more than one) of the non-anchor neighbor keypoints are allowed to be missing in order to increase the fingerprint robustness in case of missing or extra keypoints. The stronger anchor keypoints, however, are required to be present in both query and target images to obtain a fingerprint match.

Under one embodiment of this application, up to three keypoints are allowed to be excluded under limited affine distortions in small localized neighborhoods. Of course, more than three keypoints could be excluded depending on system considerations. Thus each given keypoint gives rise to a number of fingerprints by leaving out three non-anchor keypoints at a time. Each fingerprint is created by systematically walking the remaining anchor and non-anchor keypoints in radial order of orientation, and recording the sequence of quantized persistent ratios for all the possible combinations of P points (P=4 for affine, P=5 for perspective transformation). FIG. 9 illustrates an example of the fingerprint output for a single image in the case of Na=2 anchor keypoints, N=8, P=4, and Q=8. Each keypoint gives rise to a number of fingerprint sequences of length 35 in this case.

Figure 10:
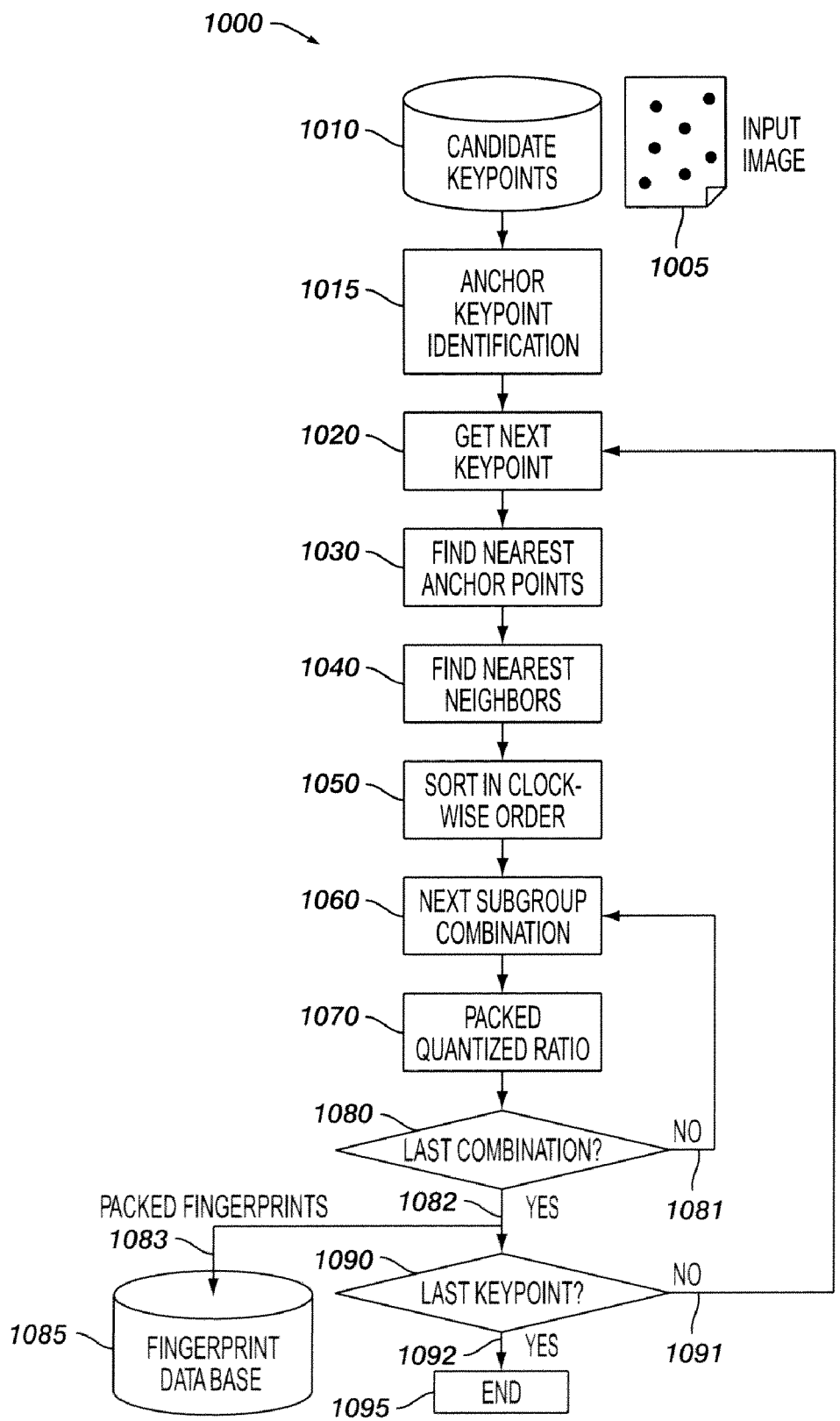
FIG. 10 is a method of Generating a Packed Fingerprint Database from a combination of Anchor and non-Anchor Keypoints.

A Fingerprinting process 1000 is shown in detail in FIG. 10. The input to the Fingerprinting process 1000 is the list of candidate keypoints 1010 for the input image 1005.

The first step in FIG. 10 is the Anchor Keypoint Identification module 1015 selects a suitable subset of anchor keypoints among the candidate keypoints found in the input image 1005 based on the various criteria such the keypoint strength, scale, location, and/or proximity to other keypoints as mentioned above.

A set of fingerprints is computed for each keypoint in the candidate keypoint list 1010. Each current candidate keypoint Kp is selected sequentially from the input list by the Get Next Keypoint module 1020. For each candidate keypoint, the Find Nearest Anchor Keypoint module 1030 identifies the Na nearest anchor keypoints with the closest distance to the given keypoint Kp. In turn, the Find Nearest Neighbors module 1040 identifies the (N−Na−1) nearest non-anchor keypoints with the closest distance to the given keypoint Kp. The returned keypoints are sorted by increasing distance from Kp. The overall number of keypoints N is chosen to provide a good tradeoff between the fingerprint "strength" (distinctiveness), overall system performance (number of computations per fingerprint), and the resulting database size (fingerprint size). In one embodiment the values, N=8, 12, and 16 are used.

The Sort in Clockwise Order module 1050 sorts the list of N−1 nearest anchor and non-anchor keypoints of a given keypoint in increasing clockwise orientation in order to provide a consistent sequence of quantized area ratios between the target and query images. For each fingerprint, the Sort in Clockwise Order module uses the current keypoint and Na closest anchor keypoints to calculate a subgroup center of origin. The non-anchor keypoints are not used in the calculation of a subgroup center of origin, in order to ensure that the origin will remain stable even in case of some extra or missing non-anchor keypoints.

After determining the center origin of the current neighbor keypoint cluster, the Sort in Clockwise Order module 1050 proceeds to sort the keypoints in increasing clockwise orientation order. The sorting is done on both orientation and distance. The primary order is by increasing clockwise orientation order. However, if two or more points have roughly the same orientation (within a predefined tolerance level), the points are sub-ordered by increasing distance for all the points of about the same orientation. The location of the center of origin is pointed out by the arrow from the current keypoint location (e.g., location 1 in FIG. 6).

Once the ordering of N nearest anchor and non-anchor keypoints has been established for a given keypoint, a fingerprint can be generated. Fingerprints are formed from successive subsets of size P=4 of the keypoints in a neighborhood. P-subsets of the N keypoints are considered in a systematic and consistent manner by the Next Subgroup Combination module 1060. For each, an integer is determined by computing the persistent area ratio for that P-subset, and mapping the area ratio to an integer. The length of a fingerprint for the given keypoint is the total number of such P-subsets. This is determined by the number of combinations for choosing unique P keypoints out of N keypoints. For example, if N=8 and P=4, the number of possible subgroup combinations is 70 persistent ratios.

For each unique subset of N keypoints, the Packed Quantized Ratio module 1070 calculates a single persistent ratio and quantizes it using a set of predefined thresholds. The number of quantization levels Q is a design parameter, for example, using Q=8 or Q=16. The quantization threshold values are determined empirically by studying the distribution of persistent ratios in a large collection of pictures of a particular category.

In order to further reduce the size of the Fingerprint Database 1085, the Packed Quantized Ratio module 1070 packs a number of the resulting quantized persistent ratios into one machine word. For example, with N=8, P=4, and Q=8, the entire fingerprint (sequence of 70 combinations) can be tightly packed into less than four 64-bit words. In one embodiment of this application, the size of a packed fingerprint occupies a total of three 64-bit words and three 8-bit bytes (with no need to split partial information across multiple words and/or bytes).

The process of calculating and packing the fingerprints continues sequentially, one persistent ratio at a time, until the last combination is detected by the Last Combination module 1080. If the current P subgroup combination is not yet the last combination 1081, the Last Combination module 1080 routes the flow back to the Next Subgroup Combination module 1060, to obtain the next P subgroup and proceed to calculate its quantized persistent ratio and pack it. This process continues until the last P subgroup combination has been processed 1082. At this time, the resulting packed fingerprint data 1083 is written to the Fingerprint Database 1085. Note that the fingerprint data can be written to the Fingerprint Database 1085 sequentially, one fingerprint at a time, as each packed fingerprint instance is becoming available.

Finally, the process of writing the fingerprints continues sequentially for all the remaining keypoints, until the last keypoint is detected by the Last Keypoint module 1090. If the current keypoint combination is not yet the last keypoint (NO-1091), the Last Keypoint module 1090 routes the flow back to the Get Next Keypoint module 1020, to obtain the next keypoint and proceed to repeat the steps to calculate its packed fingerprint and adding it to the Fingerprint Database 1085. The Fingerprinting process continues in this manner until the last keypoint combination (last corresponding fingerprint) has been processed and added to the Fingerprint Database 1085. Once the last keypoint has been addressed, the process ends 1095.

I.b. Preparing Fingerprints Information for Fast Matching

Figure 11:
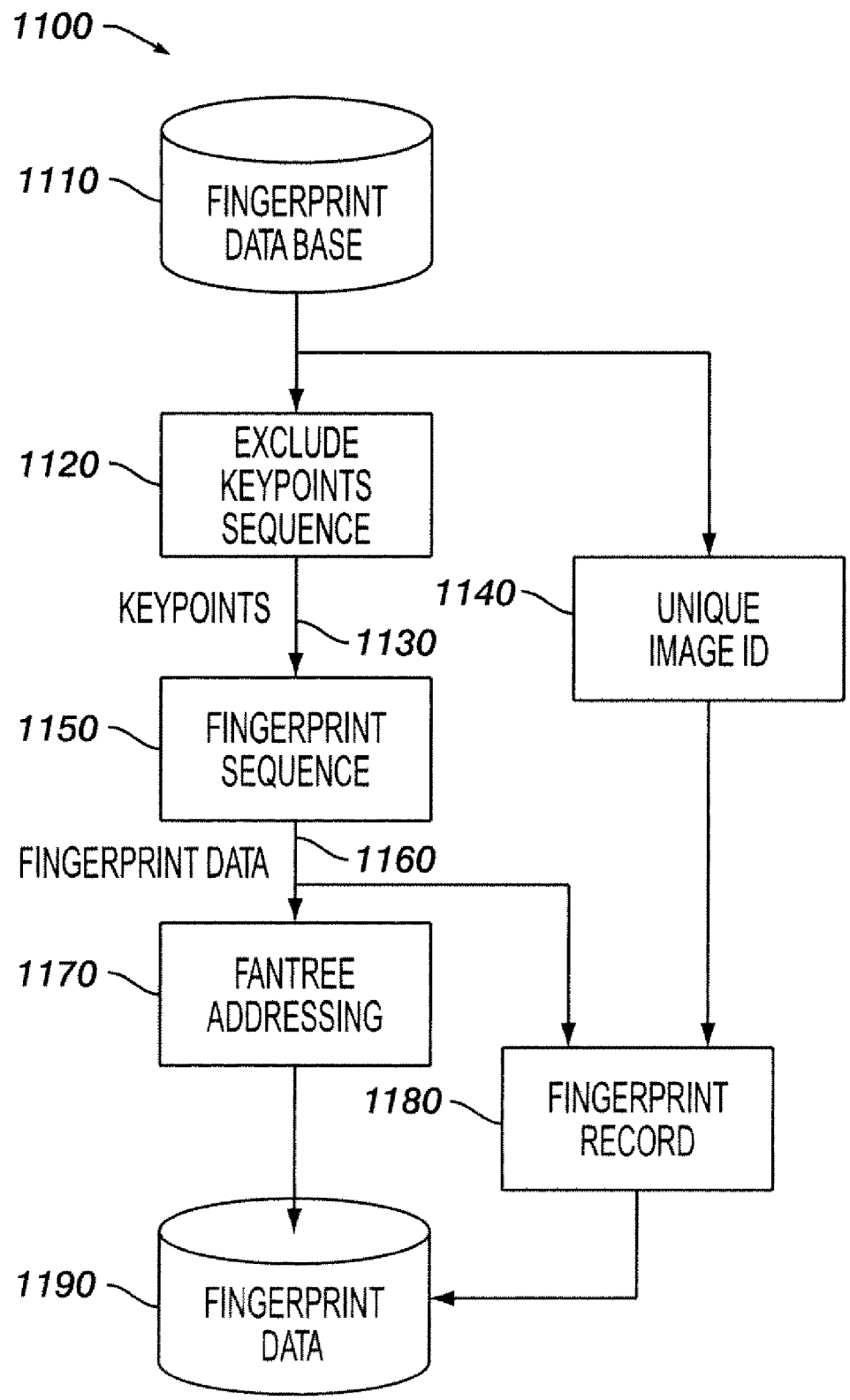
FIG. 11 is a method of building a Fan Tree from the Fingerprint database.

Turning to FIG. 11, illustrated is a process 1100 for building a Fan Tree from the Fingerprint database 1110. The fingerprints in the Fingerprint database 1110 are stored in a packed format to reduce the memory size and loading time. Before they can be used, the fingerprints are first unpacked and organized in a unique manner in accordance with the Fan Tree data structure to facilitate efficient fingerprint matching. Note that it is only necessary to prepare the Fingerprint Database once, upon the first image query. The Fan Tree data structure (containing the unpacked fingerprint sequences) can be kept in memory and be subsequently re-used with any number of image queries.

Initially, the Exclude Keypoints Sequence module 1120 selects multiple candidate fingerprint keypoint combinations by excluding a number of the fingerprint non-anchor keypoints 1130. This allows for one or more missing or extra non-anchor keypoints among the local neighborhood keypoints. In this implementation, the Exclude Keypoint module 1120 leaves out a fixed number Ne of non-anchor keypoints. With a local neighborhood of N−Na non-anchor keypoints, this gives rise to a number of fingerprints for each database entry (or keypoint).

The Fingerprint Sequence module 1150 generates the sequence of candidate fingerprints for each keypoint. For N=8, for example, the Exclude Keypoint module 1120 will cause the first fingerprint to be generated by leaving out the first Ne non-anchor keypoints and selecting the remaining non-anchor keypoints. After that, the Exclude Keypoint module will generate the next combination of keypoints excluding the first, second, and forth non-anchor keypoints for creating the second fingerprint. This process continues until all excluded keypoint combinations have been encountered.

The Fingerprint Data 1160 output from the Fingerprint Sequence module 1150, together with the unique image ID 1140 of the current image that is retrieved from the database, forms a fingerprint record 1180. The fingerprint record 1180 is stored in a corresponding Fan Tree Leaf node location which is addressed by the Fan Tree module 1170. The Fan Tree Leaf node information is stored as a linked list of fingerprint records 1180 in the corresponding Fingerprint Data structure 1190. Only the actual Fan Tree Leaf nodes (corresponding to real fingerprints) are populated. The first fingerprint to arrive at a particular leaf node populates that leaf node for the first time. If more than one fingerprint happens to arrive at the same leaf node again (i.e., following a same Fan Tree path), the second fingerprint information is added at the same leaf node by linking the second fingerprint information with the first fingerprint information on that leaf node.

In an embodiment of this application, the fingerprint sequences are permuted in accordance with SLCD method as previously described in order to facilitate the matching of corresponding fingerprints even when the query image is rotated relative to the target image, and allow non-anchor keypoints to be missing due to perspective distortion and other image quality degradations during the capture process.

In the context of this application, the permutated fingerprint sequences are used instead of the original fingerprint sequences. The advantage of using the permutation is that it considerably reduces the number of candidate fingerprint sequences that need to be matched. Rather than examining all the possible cyclic combinations of the original fingerprint sequence, only a few permutations of the smallest least common digit are investigated. The permutation are generated and stored in advance during the Fingerprint Data Base preparation. At query time, only the first permutation of the query fingerprint sequence is used for matching (since all permutations have been stored in advance and the correct one will be automatically found).

The use of permutations in accordance with the embodiment of this application provides a significant performance boost at a slight storage increase, since the number of permutations, on average, is much smaller than the original fingerprint sequence length.

In one embodiment of this application a test is carried to establish the rotational orientation of the first observed keypoint of the query image relative to the target image position.

The test is performed by evaluating each of the possible first observed query keypoint combinations and choosing the best sequence match.

In a second preferred embodiment of this application, the N possible first observed query keypoint combinations are pre-calculated in advance and stored as additional candidate fingerprint sequences to match against. At query time, any query fingerprint that matches one of the N pre-computed combinations is considered to be a match. The likelihood of the wrong query fingerprint actually matching one of the extra combinations is small. The main advantages of the second embodiment are in enabling higher matching performance and lowering the query computational load relative to the first embodiment, at the expense of somewhat larger storage to contain the additional candidate first keypoint fingerprint combinations.

In a third and preferred embodiment, the Smallest Least Common Quantization Digit method (SLCD) method is used. The SLCD method is based on performing a histogram of the fingerprint digit sequence to determine the smallest least common quantization digit and permuting the fingerprint sequence for each smallest least common digit position. The advantage of the SLCD method is that it seeks to minimize the number of permutation per fingerprint at a good balanced computational load without requiring an exhaustive search throughout the space of all possible fingerprint sequence digit permutations.

Figure 12:
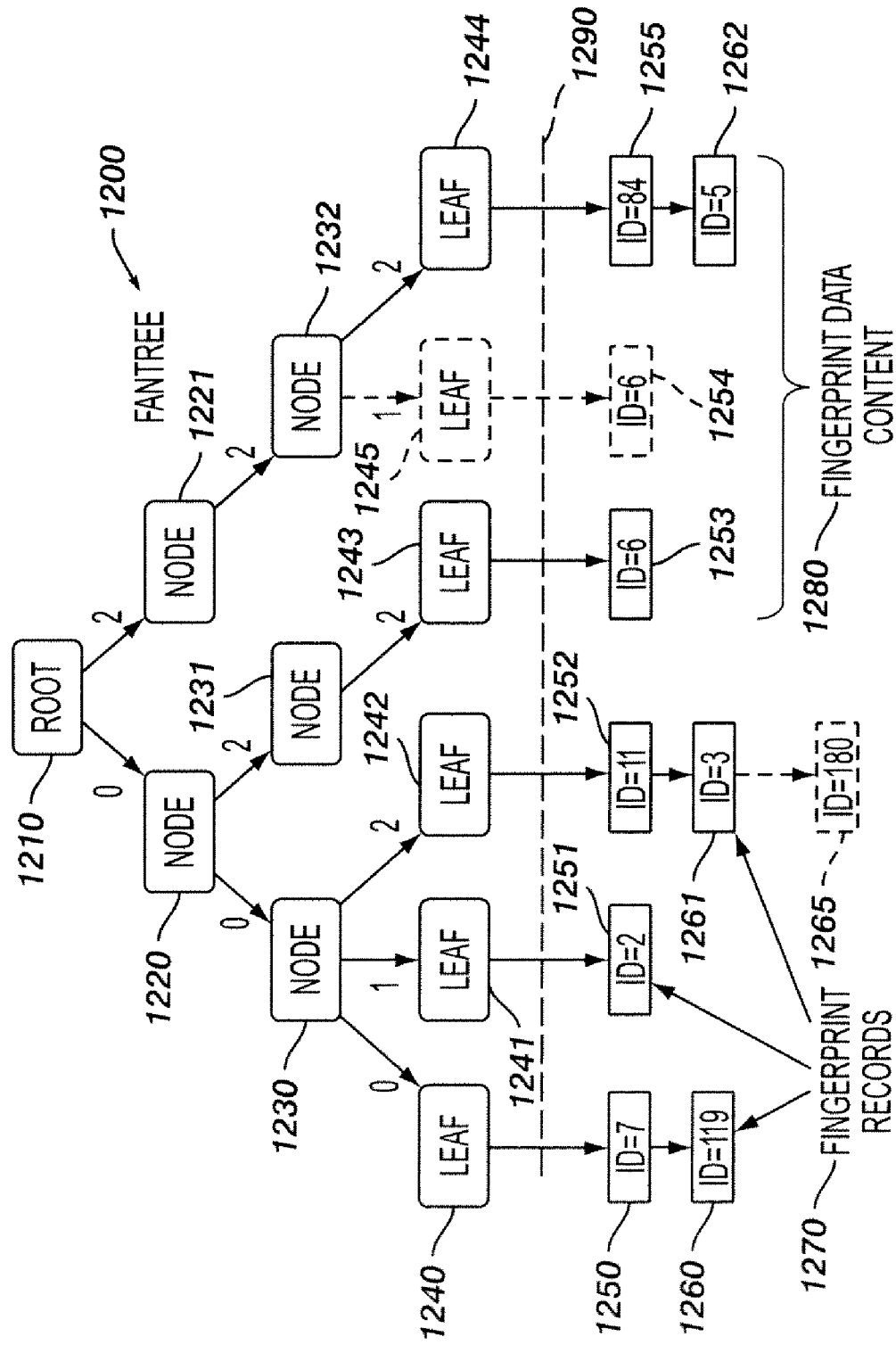
FIG. 12 is an illustration of a Fan Tree Structure and Corresponding Fingerprint Data Content.

The permuted fingerprints are organized in a unique manner in order to facilitate fast and efficient fingerprint matching. In one embodiment of this application, the permuted fingerprint information is organized using a hashing scheme for fast fingerprint matching between the query image and candidate fingerprints in the picture collection. In a second embodiment of this application, the permuted fingerprint information is organized in accordance with the Fan Tree method, as also described in U.S. patent application Ser. No 12/147,624, filed Jun. 27, 2008, for "Method For Finding A Document Image In A Document Collection Using Localized Two-Dimensional Visual Fingerprints", by Doron Kletter et al. Unlike common hashing techniques, the Fan Tree allows for efficient near-neighbor fingerprint search in a high-dimensional space (e.g., near-miss fingerprints with identical sequences except for one or a few digit changes), and is at least as fast as the hashtable approach. FIG. 12 illustrates the Fan Tree structure and corresponding organization of the fingerprint content 1200 as a method for fast fingerprint indexing.

The Fan Tree structure and corresponding organization of the fingerprint content 1200 is used to organize the stored data. The Fan Tree is comprised of three types of nodes: (a) a root node 1210; (b) intermediate level tree nodes (e.g., 1220, 1221, 1230, 1231 and 1232); and (c) terminating leaf nodes at the ends of branches (for example, 1240, 1241, 1242, 1243 and 1244). The Fan Tree begins at the root node 1210. The root and intermediate level nodes each have up to N (in this case N=8) children, one for each quantization level of persistent area ratios. A fingerprint is therefore a path from the root to a leaf node of the Fan Tree, traced by the branches taken.

For example, the path (1210-1220-1230-1240) in FIG. 12 corresponds to one fingerprint, leading from the root node 1210 to a particular Leaf node 1240. This particular representation of a fingerprint (in this simple example) uses 3 branching codes (i.e., "take the left path in each node"—which is, the (0)-labeled branch 3 times) to arrive at the destination Leaf node 1240.

The potential size of a Fan Tree is large, in this case 8*8^35, but the actual Fan Tree is sparsely constructed because branches are only constructed at any given node for fingerprints that actually occur in the database. Near the root, many nodes will contain the full 8 branches, but a few levels down only a few branches may be expanded.

A Leaf node is different from the other tree node types in that it has no outgoing branches. Instead, each valid Leaf node is pointing to a linked list data structure containing a list of fingerprint records 1270, including, but not limited to elements (1250, 1251, 1252, 1253, 1254, 1255, 1260, 1261, 1262 and 1265) in FIG. 12, to be matched against the query fingerprint at query time. These also constitute fingerprint data content 1280.

The fingerprint data is efficiently organized to facilitate quick access to the relevant fingerprint records in the data base, while at the same time eliminate the need to investigate any fingerprint records that are irrelevant with respect to the current query fingerprint of interest.

The Fan Tree approach enables two ways to deal with near-miss fingerprints, which have almost the same integer sequence except for a few digit changes: (1) near-miss fingerprint combinations can be computed in advance and pre-stored in the Fan Tree. (2) near-miss fingerprint combinations can be computed from the query fingerprint sequence during query time, and backtrack the Fan Tree path at lookup time. The first method has the advantage of performing most of the computations offline at the expense of larger memory to store the additional near-miss fingerprint combinations. The second method, on the other hand, requires additional computations in real query time, but it needs no extra memory for storage.

The Fan Tree enables efficient system performance and the ability to scale up to very large collections of images (containing millions of pictures, for example). The Fan Tree is particularly suitable for large image collection sizes. In fact, with good fingerprint design, lookup time using the Fan Tree increases only slowly with image collection size. None-the-less, for small to moderate image collection sizes, a simpler hashing scheme may be used.

I.b.1. Building a Fan-Tree for a Picture Corpus

The fingerprints in the Fingerprint Database (e.g., 1190 of FIG. 11) are stored in a packed compact format to reduce memory size and loading time. This section describes how to build the Fan Tree from the compact Fingerprint Database that is extracted from a picture collection. It is only necessary to build the Fan Tree once for a given picture corpus. After the Fan Tree has been built, the Fan Tree data structure (containing the fingerprint) can be kept in memory and subsequently re-used for any number of image queries.

Figure 13:
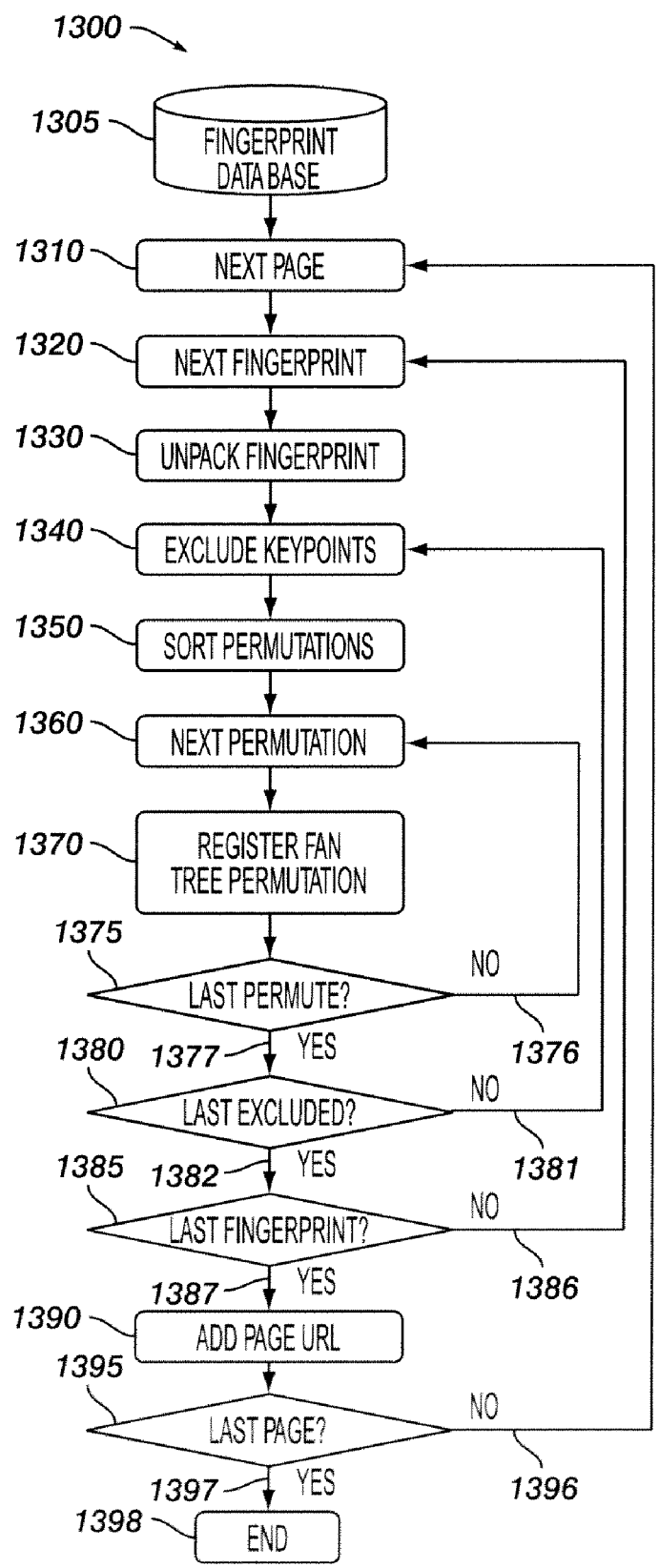
FIG. 13 is a flow diagram of the steps for building a Fan Tree Structure from a Document Collection Fingerprint database.

The process 1300 of building the Fan Tree from a given Fingerprint Database 1305 is shown in FIG. 13. The process begins by reading the fingerprint database content, one page image at a time using the Next Page module 1310. For each page, the following information is retrieved from the database: (a) The unique image ID (assigned by the Unique Image ID module (e.g., 1140 of FIG. 11) at Fingerprint Database creation time); (b) The number of identified fingerprints on the current page; and (c) The content of fingerprint records for the current page.

The unique image ID is an internal integer representation that uniquely identifies the particular page image as well as the document it belongs to. The image ID representation is conveniently used for internal indexing (because it is more compact and takes less space than using a conventional Universal Resource Locator (URL) string for that document). The actual picture content is never stored in the fingerprint database, only the fingerprint information.

The Next Fingerprint module 1320 retrieves the current packed fingerprint entry from the database for the current page. The Unpack Fingerprint module 1330 unpacks the fingerprint content, and proceeds to generate a sequence of fingerprints by excluding a number of non-anchor keypoints using the Exclude Keypoint module 1340. The resulting fingerprints are stored in the hashing or Fan Tree structure, depending on the method being used.

In the case of a Fan Tree, the new fingerprints are added sequentially, one fingerprint at a time. For each candidate fingerprint at the output of the Exclude Keypoint module 1340, the Sort Permutations module 1350 then processes the candidate fingerprint combinations to generate the permutations of the fingerprint sequence in accordance with the smallest least common quantization digit (SLCD) algorithm or other methods.

The output of the Sort Permutations module 1350 is the list of permuted fingerprint quantized ratio sequences for the current fingerprint of interest. The list is guaranteed to contain at least one permutation entry in accordance with the properties of the smallest least common digit algorithm. Occasionally there may be more than one permutation in the list of permuted fingerprint sequences. The number of permuted fingerprint sequences can very under the SLCD method. Note that in the embodiments of this application not using permutations, the Sort Permutations module 1350 is bypassed, passing the un-permuted fingerprint sequence from the Exclude Keypoint module 1340 directly to the output of the Next Permutations module 1360.

The Next Permutation module 1360 retrieves the current fingerprint permutation sequence from the output of the Sort Permutations module 1350. Each permuted fingerprint is sequentially registered. The Register Fan Tree Permutation module 1370 registers the current permutation in the Fan Tree and adds a corresponding data record to the existing Fingerprint Data Content. The registration process is equivalent to building the Fan Tree from the bottom up, by adding only the nodes and branches necessary to describe the new fingerprint sequence. If the entire fingerprint path already exists in the Fan Tree, the tree structure is not modified, and only the current fingerprint record is added to the existing Fingerprint Data Content by linking it to the last previous entry.

If, on the other hand, the new fingerprint path does not already exist in the Fan Tree in its entirety, the missing tree nodes and branches are added to the Fan Tree as necessary to complete the path. In addition, the current fingerprint record is added to the existing Fingerprint Data Content and linked with the newly formed Leaf node. The end result is that the Fan Tree is expanded to include the current fingerprint, and its content record is added, one fingerprint path at a time, to the Fingerprint Data Content.

When a hashing scheme is used instead of a Fan Tree, the fingerprint records are hashed into a large hashtable in a well known manner in the art.

The process of adding the next fingerprint permutation to either the Fan Tree or hashing scheme continues sequentially, one permutation at a time, until the last permutation is detected by the Last Permutation module 1375. While the current permutation is not yet the last 1376, the Last Permutation module 1375 routes the flow back to Next Permutation module 1360 to obtain the next permutation and proceed to register its content in the Fan Tree/hashtable. This process continues until the last permutation has been processed 1377.

After all permutations of the current fingerprint of interest have been registered, the procedure moves to the Last Excluded Keypoint module 1380. If this is not the last candidate fingerprint combination 1381, the process is routed back to the Excluded Keypoint module 1340) to process the next candidate fingerprint combination with the next keypoint being excluded. This continues until all the possible combinations of excluded keypoints have been registered in the Fan Tree 1382 and their content added to the Fingerprint Data 1305.

The process of unpacking, excluding keypoints, sorting the permutations, and registering all the resulting permutations in the Fan Tree or hashing scheme continues sequentially, one fingerprint combination at a time, until the last fingerprint is detected by the Last Fingerprint module 1385. While the current fingerprint is not yet the last fingerprint 1386, the Last Fingerprint module 1385 routes the flow back to the Next Fingerprint module 1320, to obtain the next fingerprint and proceed to unpack, sort the permutations, and register all of them in the Fan Tree or hashtable. This process continues until the last fingerprint for the current page of interest has been processed 1387.

Once all the fingerprints of the current page of interest have been processed in the manner described above and all their permutations successfully registered in the Fan Tree and added to the Fingerprint Data Content, the Add Page URL module 1390 retrieves the current page URL (Universal Resource Locator) and adds the reverse mapping from internal unique image ID to true document URL in a separate data structure table. The unique image ID number is used internally since it is more compact than the full URL string.

Finally, the processing of pages to retrieve their fingerprints from the Fingerprint Data Base 1305, unpack, sort, and register all permutation in the Fan Tree and Fingerprint Data Record continues sequentially, one page at a time, until the last page is detected by the Last Page module 1395. If the current page is not the last page yet, the Last Page module 1395 routes the flow back to the Next Page module 1310, to obtain the next page and proceed to register 1370 its fingerprint permutation content in the Fan Tree and associated Fingerprint Data Content. This process continues until the last page has been prepared for initial query use 1397 and the process ends 1398.

The entire process of Building the Fan Tree can be done offline before the first image query. Once the Fingerprint Data Base has been prepared in accordance with the embodiment of this application, it can be reused with subsequent image queries. It is only necessary to rebuild the Fan Tree in case the reference image data has changed, such as after the addition or removal of some target images.

I.c. Runtime Query

Figure 14:
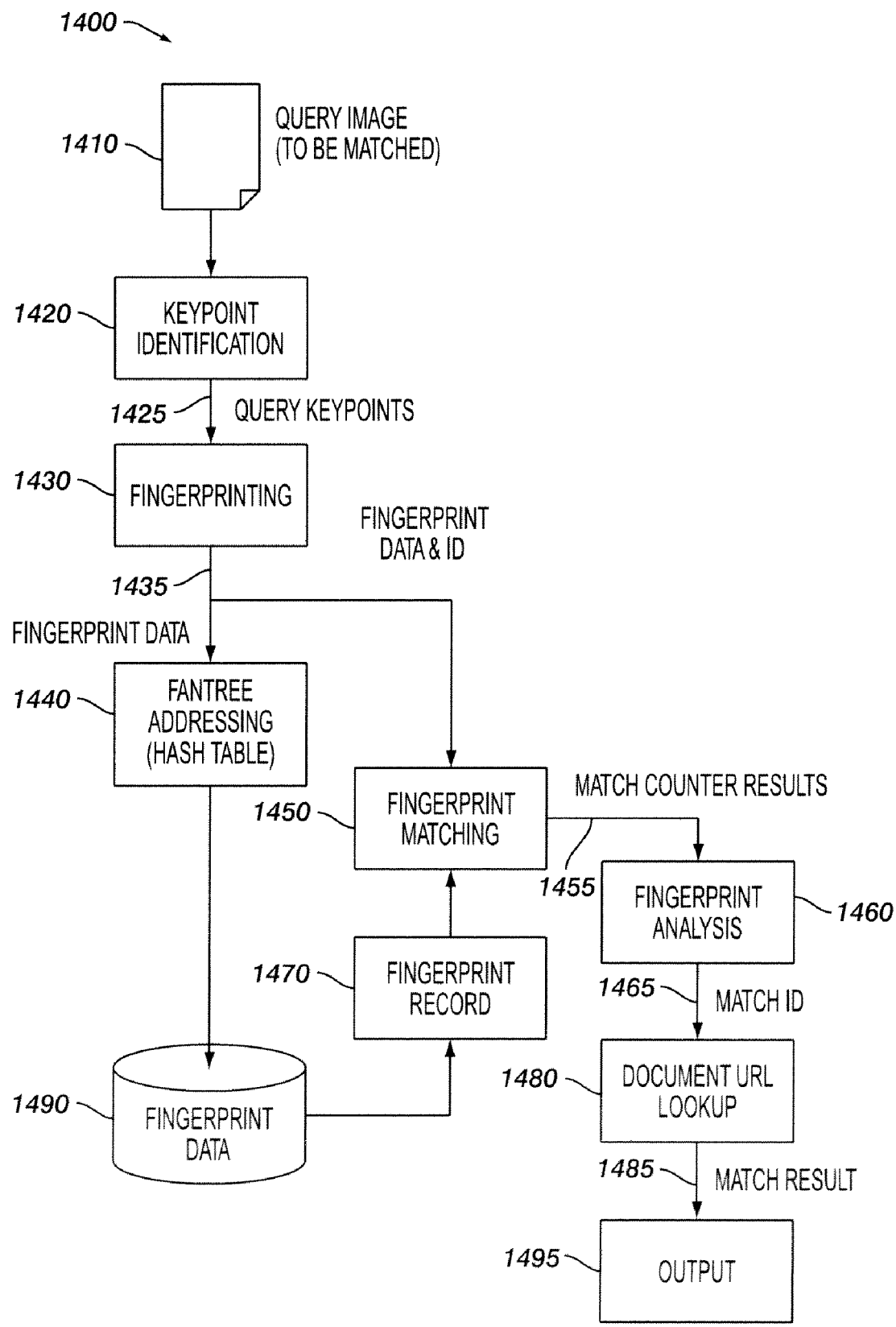
FIG. 14 is a flow diagram of the steps for Matching a Query Image in Real Time.

The process of matching a query fingerprint 1400 is illustrated in FIG. 14. The query image 1410 to be matched is presented at the input, and is processed to identify the candidate keypoint locations by keypoint identification step/module 1420. The keypoint identification process in 1420 is similar to the process that is used for finding keypoints for the picture corpus previously described, with notable differences related to the expected lower quality of query images.

The list of candidate keypoints 1425 of the query image 1420 is processed to select a small subset of suitable anchor keypoints based on the relative keypoint strength, scale, location, and proximity to other keypoints. Due to their strength, the anchor keypoints are likely to be found with high probability in both query and target images.

Keypoints are processed by Fingerprinting module 1430 in small local neighborhood groups to generate candidate query fingerprints for matching. A query fingerprint is computed for each candidate keypoint at the output of the keypoint identification module. Each query fingerprint is computed from the 2D locations of: (a) the current keypoint location; (b) a predetermined number of the nearest anchor keypoints to the current keypoint location; and (c) a number of the nearest-neighbor non-anchor keypoints. The fingerprinting method for query images is similar to the fingerprinting method for the picture corpus, with notable exceptions due to the expected lower quality of query images (introducing a Noise Guard method below) and a different query fingerprint permutation scheme.

In one embodiment of this application all the available keypoints identified in the input image are used. In another embodiment, the available keypoints are sorted by relative strength and other considerations such as the keypoint scale, location, and/or proximity to other keypoints, and selecting only a fixed number of the best keypoints to output. In a third embodiment, the input image area 1410 may be sub-divided into a set of (overlapping or non-overlapping) regions, and a number of preferred keypoint selected from each region to prevent one region from dominating all others. In yet a forth embodiment of this application, the Fingerprinting module 1430 may only select the most indicative candidate query fingerprints based on an analysis of the frequency of digit or digit pattern occurrence in the fingerprint sequence (since rare and unusual digit patterns are more indicative).

The output of the Fingerprinting module 1430 is the list of candidate query fingerprints 1435 for each group of local keypoints.

The candidate query fingerprint 1435 list may include al or just a subset of all identifiable fingerprints, depending on the particular application and the desired performance level (in terms of processing time and accuracy). For example, only a small subset of the most indicative fingerprints may be selected based on the relative fingerprint strength. Alternatively, when the processing time is not of primary concern, all available candidate query fingerprints may be used for best accuracy. Thus the number of candidate fingerprints at the output of the fingerprint module 1430 can be adjusted as tradeoff between accuracy and speed.

The query fingerprints of Fingerprinting module 1430 are then subsequently converted to Fan Tree paths by the Fan Tree Addressing module 1440 which determines the corresponding Leaf node for each query fingerprint. The Leaf node content is looked up in the fingerprint data structure 1490, to retrieve the list of matching fingerprint records 1470 for the particular Leaf node.

When a hashing scheme is used instead of a Fan Tree, the query fingerprints are converted to hash addresses by the Addressing Module 1440, which are used to look up and retrieve a similar list of candidate fingerprint records 1470 from the hashtable content.

The Fingerprint Matching module 1450 matches the candidate query fingerprint 1435 information against each fingerprint entry 1470 included in the Leaf node list of fingerprint records. Only when there is an exact match between the candidate query fingerprint 1435 and a particular fingerprint entry, the system retrieves the corresponding image ID and fingerprint ID combination from the matching fingerprint record 1470, and proceeds to initialize (first time only) and increment a designated fingerprint counter, of module 1450, for the unique <image ID/fingerprint ID> combination in a counter array. The system also maintains (in a separate data structure) a list of image IDs that have been encountered with at least one matching fingerprint during the fingerprint matching phase. The fingerprint matching 1450 continues until all candidate query fingerprints 1435 have been processed in this manner. The resulting match counter results 1455 array content is then forwarded to the fingerprint analysis phase 1460 for final score analysis and determination of the best matching picture or set of pictures within the collection.

The fingerprint analysis phase 1460 analyses the content of the match counter array to determine the final matching result. The specific analysis 1460 depends on the particular matching objective of the application. There could be a number of possible matching objectives. In one embodiment of this application, the objective is to find the best image match within the picture collection. In this case, the image ID which has gathered the most fingerprints match (highest score), namely the fingerprintmatch ID 1465, is a good candidate. In addition, the individual counts can be used as confidence numbers to rule out page matches with fewer than a pre-specified minimum number of fingerprint matches. The counts can also be normalized by the total number of fingerprints on a page to provide a more uniform relative measure (since some pages may have many more fingerprints than others, depending on the image content).

In another embodiment of this application, the objective may be to return the list of all matching images within the collection (or a subset thereof) that meet a pre-specified minimum of fingerprint counts (or a minimum confidence level as above).

In yet another embodiment of this application, the original image area may be subdivided (with or without overlapping) into a grid of sub-images, and the fingerprint matching analysis be carried separately in each sub-image in order to provide a rough density profile of the areas where good fingerprint matching is obtained. The latter analysis is particularly suitable for situations where some of the original image may be missing or partially obscured by another object in the scene. In this case, the common image areas (not missing or obscured) will still have a high degree of matching fingerprint counts. In yet another embodiment of this application, the zoning of the image (by dividing into sub-images as outlined above) can be used to emphasize the weight of certain image areas over others. For example, giving more weight to fingerprint matches near the center of the image (where the focused object may be) and less weight to fingerprint matches on the outer periphery. This approach is particularly useful for eliminating frame boundary artifacts (along the image outer boundary). For instance, when matching images from different sources such as an electronic original and a captured image (e.g., from a scanner or cell phone camera) of a printed version of it. The latter technique can be effectively used to prevent the formation of candidate keypoints due to the introduction of artificial background outside the image boundary (e.g., image corners against paper white or blue screen color, etc.).

The output of the Fingerprint analysis module 1460 is the final list of a single or plural matching image IDs 1465, depending on the desired matching objective. In Document URL Lookup module 1480, the list is converted from the internal integer representation of the unique image ID of Fingerprint analysis module 1460 to the true document URL (Universal Resource Locator), which identifies the location of the matching image or images. The conversion is accomplished in the Document URL Lookup module 1480 and a match result 1485 is produced. In one embodiment, an inverse mapping table, which is created by a unique Image ID module at the time of the generation of the fingerprint database 1490 is used to look up the URL using the unique image ID as an index. Finally, the matched result 1485 is passed to an output 1495 which may be a display, such as an electronic display, a printer to provide hardcopy output, a memory storage, or it may be transmitted to other compatible devices.

I.c.1 Identifying Candidate Query Keypoints

The method of identifying stable keypoints in a query picture image is similar to the process used for identifying stable keypoints for a picture corpus described in the foregoing discussion including the discussion related to FIG. 6. The method is based on constructing a scale space pyramid representation of the query image at multiple scales by applying a specific set of filters to the query image and combining together the filter outputs to form a single function D(x,y,s) of scale and space. Stable keypoint locations are identified in each scale as the pixel locations at which the function D(x,y,s) attains a peak value (either a maximum or a minimum) in the local scale space neighborhood.

Figure 15:
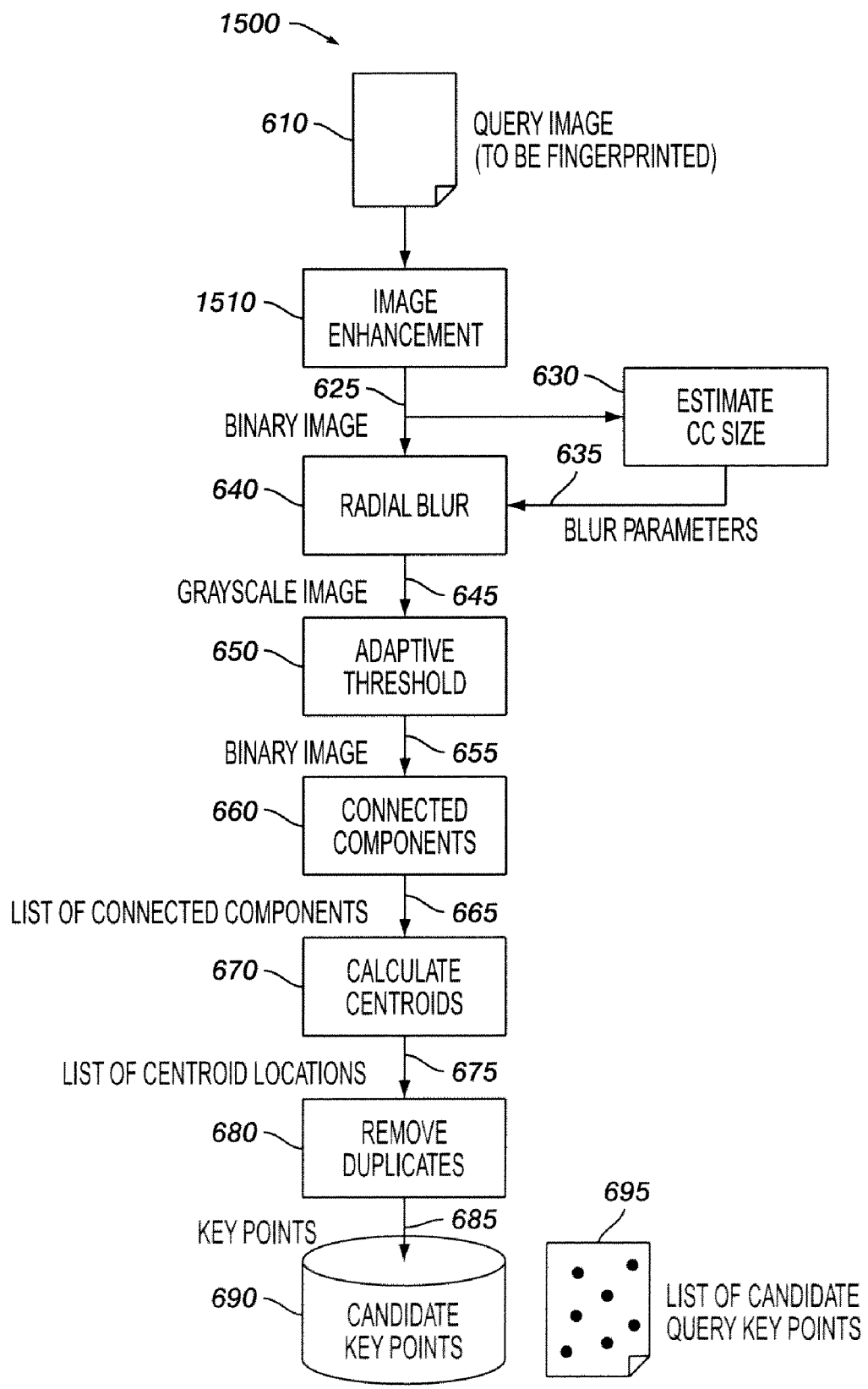
FIG. 15 is a flow diagram for identifying Query Candidate Keypoints.

One difference from the description involving FIG. 6, as illustrated in query candidate keypoints identifying flow diagram 1500 of FIG. 15 is that an Image Enhancement module 1510 is introduced prior to adaptive threshold module 620 in order to address the potentially lower quality of query images. In certain applications the query images may be captured with a low-quality cell phone camera, from a printed hard copy or a screen version of the target image. In this situation, the query image may exhibit considerable image degradation due to a number of factors such as: low resolution, blur, noise, varying illumination, reflection, perspective viewing distortions, etc. Thus, it may be desirable to add a first Image Enhancement module, in order to apply the necessary image enhancements for improving the input image quality prior to query keypoint identification. The specific enhancements and modifications to the Image Enhancement module depend on the application, the expected quality of the query images, the anticipated image distortions, and the desired accuracy and performance goals. It may also be understood that Image Enhancement module 1510 may also be introduced prior to the Keypoint Identification module 1420 of FIG. 14, which presents the system and method for matching a query image in realtime.

In one embodiment of this application, the Image Enhance module includes a background estimation module to estimate the varying camera illumination across the query image scene. The Background Estimation may include the estimation of the brightest pixel level in certain pixel areas and fitting a low-order two-dimensional polynomial curve to model the slowly varying illumination across the query scene. By inverting the polynomial model, the effects of the varying background illumination across the image can be neutralized and prevented from interfering with the keypoint identification process and potentially failing to adequately identify bright or dark keypoint features.

In other embodiments of this application, the Image Enhance module includes but not limited to other known image processing techniques such as contrast enhancement, sharpening, and noise removal in order to further improve the query image quality prior to keypoint extraction.

I.c.2 Computing Query Fingerprints

This section describes the process of identifying query fingerprints and preparing them for matching against the relevant picture collection fingerprints in the Fan Tree structure.

Figure 16:
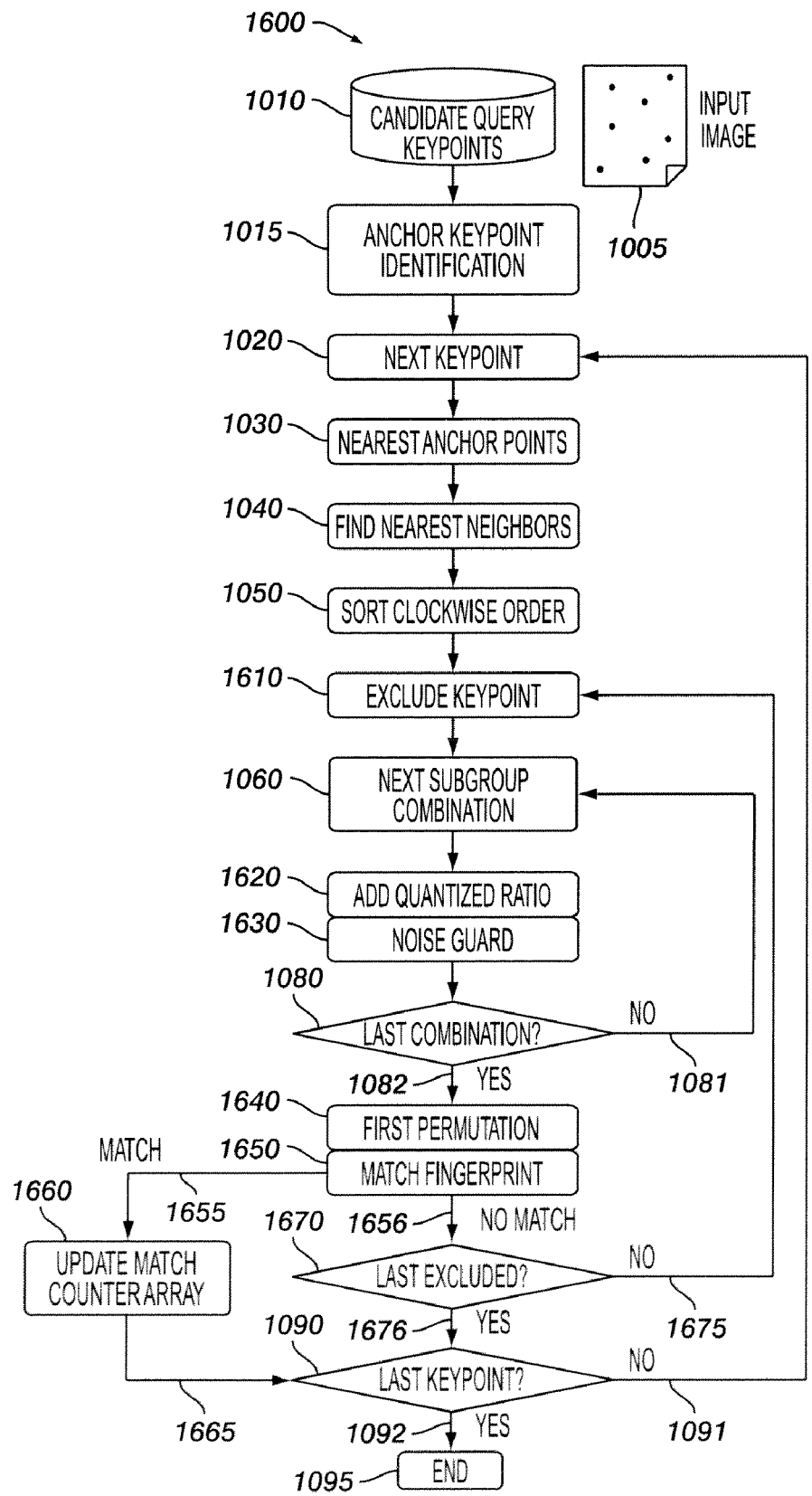
FIG. 16 is a flow diagram of the steps for Query Fingerprinting.

The query fingerprinting process is illustrated in FIG. 16. The fingerprinting method for query images is similar to the fingerprinting method for the picture corpus as detailed in connection with FIG. 10. Therefore, for convenience of description, those modules corresponding to FIG. 10 are numbered as before. However, there are a number of notable differences related to the expected lower quality of query images (e.g., introducing a Noise Guard module 1630) and a different query fingerprint permutation scheme (e.g., First Permutation module 1640).

A first difference is that the query fingerprints are not packed (so the Packed Quantized ratio module 1070 of FIG. 10 is not used) since there is no need to save the query fingerprints in the Fingerprint Database. Instead, the query fingerprints are merely processed (e.g., Add Quantized Ratio module 1620, Noise Guard module 1630, First Permutation module 1640) and matched (e.g., Match Fingerprint module 1650), one query fingerprint at a time. Each query fingerprint is looked up the Fan Tree or hashtable to retrieve the list of relevant candidate fingerprints to match against. Once the matching process of a given query fingerprint is complete, the query fingerprint is discarded, and only the matching results (in terms of a match counter array) continue to accumulate from one query fingerprint to the next.

A second difference is that the query fingerprinting requires no sort of the permutations because all the permutations are generated in advance during the preparation phase of the picture collection; at query time only one permutation, the first to occur (First Permutation module 1640), is used. Since all the possible permutations have been prepared and registered in advance in the Fan Tree or hashtable, any valid permutation should have a corresponding match.

A third difference is that the Noise Guard concepts (e.g., 1630) described below can be applied during the Fan Tree preparation phase, or alternatively, at query time. Applying the Noise Guard method at query time is more economical in that it requires no extra storage memory, and the Fan Tree provides a convenient way for handling near-miss fingerprints, for a slight increase in computations.

Another key difference is related to the need to minimize the query matching time. In many applications the query matching occurs in real time, while the system is expected to meet or exceed certain tight performance requirements. In such situations it is generally desirable to have an unbalanced, front-loaded system that allocates more time to sorting out potential fingerprint combinations and preparing whatever possible in advance in order to minimize the actual query matching time. For example, during the offline stage of building the Fan Tree or hashtable, the method of this application registers in advance all the possible fingerprint permutations including for combinations of missing keypoints. Any one of these combinations is sufficient to obtain a fingerprint match. Once the first match (e.g., 1655) is observed, there is no need to continue looking for additional matches for the particular fingerprint.

Rather, the process increments the Update Match counter array 1660 for target documents of any matching target fingerprints, and the process proceeds 1665 to determine if the Last Keypoint has been encountered 1090. Alternatively, when Match Fingerprint module 1650 finds no match 1656, the process is routed to Last Excluded module 1670 where, once determined, the process has not excluded the last keypoint (NO-1675), the process moves to Exclude Keypoint module 1610 and a new keypoint is excluded and the process moves on. When it is determined the keypoint is not the last excluded keypoint (YES-1676) the process continues to Last Keypoint module 1090, to determine if all query keypoints have been encountered. If there are additional as yet unprocessed query keypoints (NO-1091), the flow is routed to Next Keypoint 1020 to process the next keypoint; otherwise (YES-1092), the process end upon the last query keypoint. The overall query time is minimized by sorting and placing the more likely matches first in the Fan Tree or hashtable.

A still further difference is that the first query permutation 1640 to match will stop any further permutation search for the particular fingerprint and other missing keypoint combinations in order to minimize the overall matching time in accordance with this embodiment.

I.c.3. Noise Guard Method

The Noise Guard module/method 1630 also described in U.S. patent application Ser. No. 12/147,624, filed Jun. 27, 2008 for "Method For Finding A Document Image In A Document Collection Using Localized Two-Dimensional Visual Fingerprints", by Doron Kletter et al, and which is now shown in use in FIG. 16 can be optionally applied during the computation of fingerprints to overcome a common problem with existing methods and lead to superior fingerprint matching performance.

The Noise Guard 1630 is designed to prevent a small change in the location of a keypoint (due to noise and/or finite rounding errors, for example) from leading to a different quantized integer value when a persistent ratio value falls close to a quantization boundary. The Noise Guard method monitors the distance from the persistent ratio value to the nearest quantization thresholds. When this distance is below a pre-specified tolerance level, the Noise Guard module generates both quantization sequences as possible candidates, such that a fingerprint match will be obtained in either case.

Consider the fingerprint:
"14603616376756326322477662652206667".

Assume the value of the fifth persistent ratio is 0.9999, which is just below an interval boundary of 1.0, and thus gets quantized to an integer value of '3' as shown in FIG. 8B. This is for the target image in the collection.

In the degraded query image, the presence of noise or some small rounding errors in the calculation of this persistent ratio could well push its value just above the interval boundary, say to 1.0001 (a very small change of 0.0002 from 0.9999). Because it is now larger than 1.0, it will get quantized to '4' instead of '3', and the resulting query fingerprint will no longer match "14604616376756326322477662652206667". The branching at the fifth digit will now lead to an entirely different Fan Tree path.

The Noise Guard method monitors the incoming persistent ratio before quantization to see if they happen to fall close to an interval boundary. Only for those that fall close enough, both fingerprint sequences are entered into the Fan Tree. That is, instead of a single fingerprint sequence, two fingerprints are entered: one with a '3' and one with a '4' in the fifth digit for the target image.

At query image time, the query fingerprint is computed and it doesn't matter if a '3' or '4', because either one exists in the Fan Tree, and a correct match will always be found.

The power of the Noise Guard method is that it only adds the combinations when they fall close to the interval boundaries. Otherwise, if blindly attempted do so for all digits, a prohibitively large number 2^35 of combinations would be generate for each fingerprint.

It should also be pointed out that the conventional hashing schemes are sensitive to such digit changes because they are designed to randomly 'hash' the input sequences, such that two nearly identical sequences of digits would typically end up far away from each other with no effective way of determining the location of one by knowing the location of the other. That is one advantage of using the Fan Tree method instead of a hashtable.

An advantage of using the Noise Guard module is that it improves the fingerprinting robustness by reducing the quantization noise sensitivity. However, this is accomplished at the expense of additional computations, since each time the quantization falls near the threshold, the number of candidate fingerprint sequences is doubled. Fortunately, the event of a triangle ratio falling near the threshold is quite rare (depending on the query image noise level), so the impact, on average, is not very large. In addition, a maximum limit is set on the number of times that the Noise Guard is applied in each fingerprint in order to maintain the overall performance level (since a fingerprint with many triangle ratios falling near the quantization thresholds is not very distinctive). In this implementation the Noise Guard module is used with a limit of 5.

The Noise Guard method can be applied either offline during picture collection pre-processing time, or online at query time. From the storage perspective, it is more economical to generate the additional noise combinations at query time rather than for the entire collection in advance. Applying the Noise Guard at query time, however, may slightly decrease the real time performance due to the additional computations. The tradeoff between storage and real time performance can be optimized depending on the expected noise level and likelihood of quantization errors.

I.c.4. Counting Query Fingerprint Matches

This section describes more detail of the Fingerprint Matching module 1640 in FIG. 16, designed to make the fingerprint matching fast and efficient.

The Query Fingerprint Matching module 1640 includes and utilizes three types of data array structures in memory in order to keep track of the matching results:

(a) The SeenDocs array contains a list of document IDs that have been encountered so far during the current query fingerprint matching. The SeenDocs list is cleared with the start of each new query fingerprint combination.

(b) The SeenFinger array contains a list of fingerprint IDs (per document ID) that have been encountered so far during the current query fingerprint matching. The SeenFinger array is cleared for each new query image.

(c) The MatchCount array contains a list of counts of matching fingerprints per document ID that have been encountered so far during the current query fingerprint matching. The MatchCount array is cleared for each new query image.

Note that in the embodiment of this application, a sequential image index number is conveniently assigned to picture images in the arrays (b) and (c) above. The conversion from image index to unique image ID number is maintained in a separate data structure.

Figure 17:
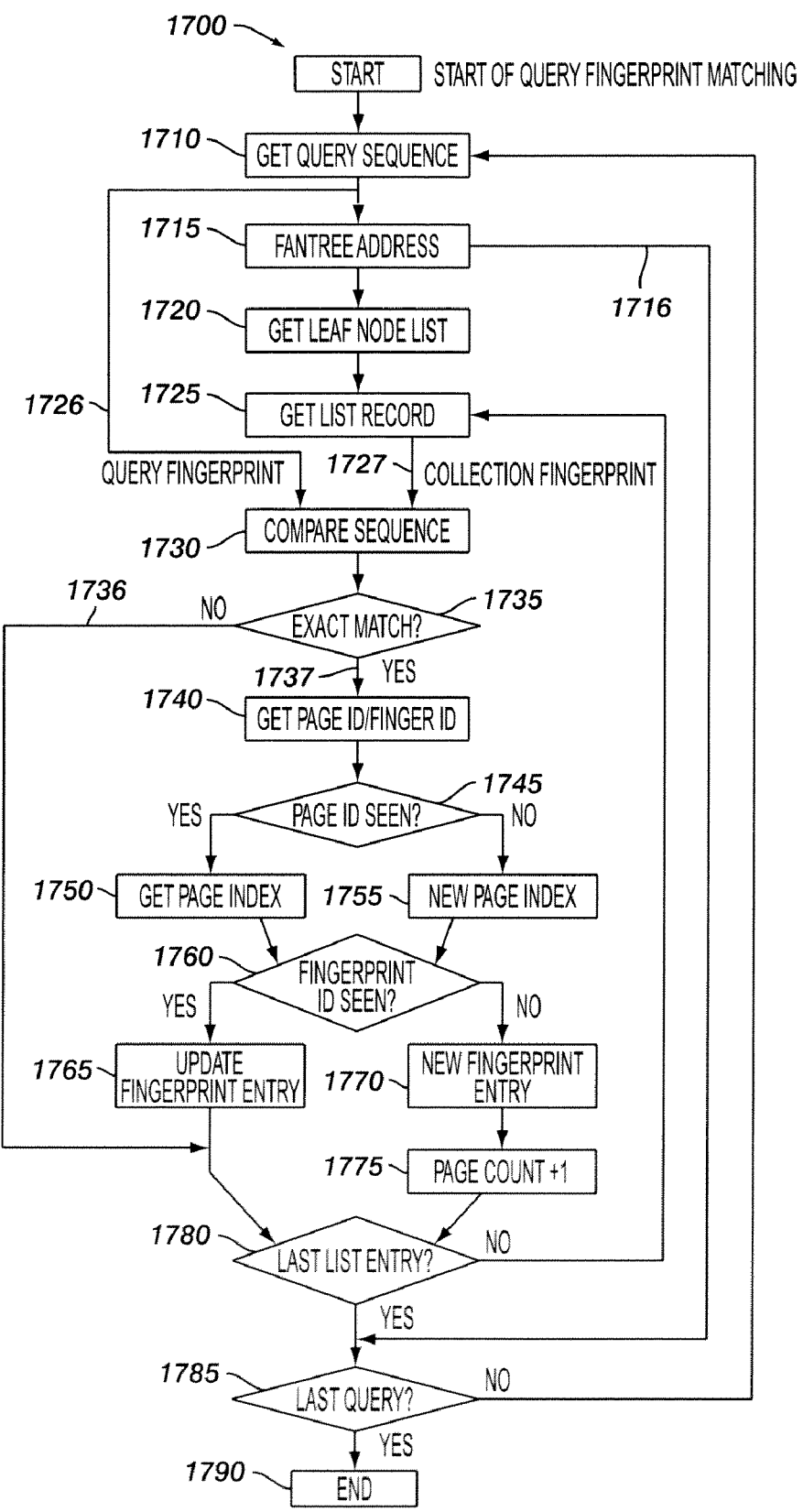
FIG. 17 is a flow diagram of the steps for Matching Query Fingerprints and Counting Document Hits.

The detailed block diagram of the Fingerprint Matching module 1650 of FIG. 16 is shown in FIG. 17 as diagram 1700. Fingerprint matching begins with a query fingerprint combination sequence from the output of the First Permute module 1640 of FIG. 16. The query fingerprint combinations are permuted in accordance with the smallest least common quantization digit (SLCD) as described above. The Get Query Sequence module 1710 obtains the current query fingerprint combination sequence to be matched from the available set.

The Fan Tree Address module 1715 uses the current query fingerprint sequence to follow the fingerprint path in the Fan Tree structure. In the event that at any point along the Fan Tree path the current tree node leads to a dead end (i.e., an unpopulated tree node), the matching of the current fingerprint is terminated and the process is routed 1716 to Last Query module 1785 to move on to the next query fingerprint sequence to be matched. The case of an empty tree node can occur when the current query fingerprint sequence is severely degraded by distortion and noise that may cause the quantized query fingerprint sequence to no longer match. When a small number of fingerprint combinations (out of thousands for a given page) fail to match, the empty node cases could simply be ignored. However, if a large number of the query fingerprints begin to exhibit the behavior of leading to empty tree nodes, than it may be a good indication that the query image does not have a matching image within the collection.

In the normal situation, the Fan Tree Address module 1715 follows the current query fingerprint path through the Fan Tree, starting from the root node, and terminating in a Leaf node as previously described. The Get Leaf Node List module 1720 retrieves the address of the corresponding Leaf node list, which contains the list of relevant fingerprint records to match against.

Alternatively, if a hashtable is used instead of a Fan Tree, the hash address is computed from the query fingerprint and used to look up the hashtable content and retrieve the list of relevant fingerprint records to match against.

The Get List Record module 1725 retrieves the current fingerprint record from the list of relevant fingerprint records. The Compare Sequence module 1730 compares the query fingerprint sequence 1726 with a target fingerprint sequence (i.e., the Collection Fingerprint) 1727 from the relevant fingerprint list. The Exact Match module 1735 looks for an exact match between the two fingerprint sequences, that is, each corresponding pair of quantized ratios having the same value. A single mismatch, even in one quantized ratio position, is sufficient to declare a no match 1736. If an exact match between the query fingerprint sequence and the current target entry is not found, the flow is routed to the Last List Entry module 1780 to move on to the next Leaf node list entry.

If, however, an exact match is found 1737 between the query fingerprint and target fingerprint sequences, the Get Page ID/Fingerprint ID module 1740 retrieves the current unique image ID and fingerprint ID from the current Leaf Node list record. The Page ID Seen module 1745 looks up the unique image ID in the SeenDocs array to determine if the current picture has already been encountered during the current query fingerprint match. If it has already been encountered, the Get Page Index module 1750 retrieves the corresponding page index of the current picture from a mapping table using the unique image ID number. Otherwise, the current picture is a new picture that has not yet been encountered. The New Page Index module 1755 assigns a new page index number to the current picture, and adds a new entry to the SeenDoc array using the unique image ID number to indicate that it has now been encountered. At the same time, the New Page Index module 1755 also adds a new entry to the Match Count array at the current page index address and initializes its value to zero (no matching fingerprints for this page).

Next the Fingerprint ID Seen module 1760 checks to see if the current fingerprint ID obtained from the current Leaf Node list record has already been encountered during the current query fingerprint match. The reason for checking the fingerprint ID is that each fingerprint is entered multiple times in the Fan Tree or hashtable, each with a different combination of excluded keypoints as documented above. However, some of the combinations may not end up in exact matches due to the presence of noise and image distortions. Thus it is necessary to keep track of the Fingerprint ID of each fingerprint to prevent situations where some images get higher counts from multiple fingerprint combinations than others. In the embodiment of this application, the solution to this problem is by checking the fingerprint ID and incrementing the Match Count array only once for each unique fingerprint ID.

If the current Fingerprint ID has already been encountered by the Fingerprint ID Seen module 1760, there is no need to increment the Match Count array. The Update Fingerprint Entry module 1765 merely updates the SeenFinger array with the page index and Fingerprint ID as necessary. If, on the other hand, the current Fingerprint ID has not already been encountered by the Fingerprint ID Seen module 1760, the New Fingerprint Entry module 1770 allocates a new SeenFinger entry and sets up its content to be the current Fingerprint ID value (i.e., in Get Page ID/Finger ID module 1740) for the current page index. In addition, the Page Count +1 module 1775 increments the content of the Match Count array for the current page index by 1 to indicate the first time that this particular Fingerprint ID is encountered during the current query match, After the matching of the current fingerprint record is complete, the Last List Entry module 1780 checks to see if there are more entries in the retrieved fingerprints record list that have not yet been matched. If the current fingerprint record is not yet the last Leaf node entry, the List Entry module 1780 routes the flow back to the Get Record module 1725, to obtain the next fingerprint record from the Leaf node list and proceed to match it with the query fingerprint sequence. The pair wise matching process continues until the last fingerprint record has been processed.

After all the fingerprint records in the current Leaf node list have all been retrieved and fingerprint matched against the query fingerprint sequence, the procedure moves on to the Last Query module 1785. If this is not the last candidate query fingerprint sequence, the process is routed back to the Get Query Sequence module 1710 to process the next candidate fingerprint combination and proceed to match it against its own list of relevant fingerprint sequences. This continues until all the possible combinations of query fingerprint sequences have all been matched against the relevant Fan Tree or hashtable content, and the process ends 1790.

The end result of the fingerprint matching process is the Match Count array content, which contains the count of matching fingerprints for each relevant picture in the collection that has at least one matching fingerprint with the query image. The number of entries in the Match Count array is the same as the number of new pictures that have been encountered during the query matching process, which is usually just a small fraction of the total number of pictures within the collection. All other pictures, comprising the vast majority of the picture collection, are never looked at during a particular image query (because they have no common fingerprints with the query image). Note that the image entries in the Match Count array are addressed by their running page index. However, the page index can easily be converted to the unique image ID number by looking up the mapping table that is created during the query matching process.

Finally, the matching results in the Match Count array are forwarded to the Fingerprint Analysis module (e.g., 1460 of FIG. 14) for final scoring analysis and determination of the best matching image or image set in the collection.

I.c.5. Final Decision

During the query fingerprint matching process the Match Count array accumulates the number of matching fingerprints for each of the relevant pictures that have at least one matching fingerprint with the query image. Typically, one particular image in the collection, the matching picture, will have many matching fingerprints (a high count), while a handful of other images may have a few occasional matching fingerprints, particularly when the collection size is large.

As mentioned above, the resulting content of the Match Count array is forwarded to the Fingerprint Analysis module for final score analysis and determination of the best matching picture or set of pictures within the collection. There could be a number of possible matching objectives. If the objective is to find the best image match within the picture collection, the image ID which has gathered the most fingerprint matches (highest score) is returned. In addition, the match count can be used as confidence numbers to rule out any page matches that have fewer than a pre-specified minimum number of fingerprint matches (to rule out occasional few stray counts due to distortion and/or noise). The counts can also be normalized by the total number of fingerprints on a page to provide a more uniform measure (since some pages may have many more fingerprints than others, depending on the image content).

Alternatively, the objective may be to return the list of all matching images within the collection (or a subset thereof) that meet a pre-specified minimum of matching fingerprint counts (or a minimum confidence level as above).

In one embodiment of this application, the original image area may be subdivided (with or without overlapping) into a grid of sub-images, and the fingerprint matching analysis be carried separately in each sub-image in order to provide a rough density profile of the areas where good fingerprint matching is obtained. The latter analysis is particularly suitable for situations where some of the original image may be missing or partially obscured by other objects in the scene. In this case, the common image areas between the query and the original (not missing or obscured) will still have a high degree of matching fingerprint counts.

In yet another embodiment of this application, the zoning of the image (by dividing into sub-images as outlined above) can be used to emphasize the weight of certain image areas over others. For example, giving more weight to fingerprint matches near the center of the image (where the focused object may be) and less weight to fingerprint matches on the outer periphery. This approach is particularly useful for eliminating frame boundary artifacts (along the image outer boundary). For instance, when matching images from different sources such as an electronic original and a captured image (e.g., from a scanner or cell phone camera) or a printed version of the picture, where the captured image may include some of the border or white paper frame that is not part of the original image. The latter technique can also be used to effectively prevent the formation of candidate keypoints along the image boundary due to the introduction of artificial background (for example, rotated image corners against paper white, or blue screen, etc.), by utilizing the above image zoning technique.

The output of the Fingerprint Analysis module 1460 of FIG. 14 is the final list of one or more matching image IDs. Then Document URL Lookup module 1480 converts the list from the internal unique image ID integer representation to the true picture URL (Universal Resource Locator), which identifies the location of the matching picture or picture set and the corresponding page numbers. Finally, the matching picture or picture set is output 1490, which means it is displayed on display, printed by a printer, stored in a memory, or transmitted to some other compatible device.

Unlike SIFT and its derivatives, the present method and system is particularly suitable for parallel implementation, since it is essentially composed of the following two subsequent steps: (a) Identification of keypoints in a query image and computing fingerprint sequences; followed by (b) Efficient Fan Tree lookup and matching of (many) independent fingerprints of a query image (during fingerprint matching). Using the novel keypoint extraction method also described in U.S. patent application Ser. No. 12/147,867, the keypoint identification phase (a) is suitable for parallel implementation since the computation of each pyramid level is entirely independent of the other pyramid levels and takes exactly the same time regardless of the filter. In contrast, the iterative nature of the conventional keypoint detection techniques that utilize a succession of Gaussian filtering and down sampling do not easily lend themselves to parallel implementation. With regard to phase (b), each Fan Tree lookup can be done entirely in parallel. For example, a large Fan Tree can be divided among several processors or independent machines. Instead of processing the query fingerprints sequentially—one fingerprint at a time—all the query fingerprints are first processed to determine their Fan Tree or hashtable addresses (using address lookup only, e.g., by module 1715 in FIG. 17). A sorting phase then follows to re-order the entire set of query fingerprints by Fan tree/hashtable address, and shipping each group of fingerprints of a given address range to the corresponding processor or machine containing that particular part of the Fan Tree/hashtable. Multiple Fan Tree/hashtable lookups can therefore be done entirely in parallel, in different machines or processors each, and the matching results tallied, forwarded to, and combined in one designated machine at the end. Thus the present method has the advantage of providing a fully parallel multi-scale picture matching scheme in its entirety.

SUMMARY

The following paragraphs summarize aspects of the present application which have been described above.

1. Instead of using local descriptors based on the gradient magnitudes and orientations in a region around a keypoint, a fingerprinting method is described which is based on extending the method also described in U.S. patent application Ser. No. 12/148,624. The fingerprints are far more compact and less time consuming to compute, yet they are just as distinctive. If the keypoints are very stable, many fingerprints will be identical between the target and query images of the same picture, while few fingerprints will match between the target and query images of different pictures.

2. Described is a method and system for selecting superior keypoints as anchor points for the fingerprint analysis. The anchor points are the set of the most stable and robust keypoints that are likely to be reliably found in both target and query images. Unlike the case of document images where features such as word centroids provide excellent localization, keypoints in continuous-tone pictures are more challenging to localize in the presence of noise, image degradations, and changes in viewing conditions. While most of the keypoints are likely to be found in similar images, it is often the case that few of the weaker keypoints may be missing in one image and other keypoints may have been introduced due to the changes. Thus it is difficult to establish a one to one keypoint correspondence between the target and query image. The anchor points are selected based on the keypoint strength and distance. Each anchor point is associated with a local region of influence. The anchor points serve to synchronize the fingerprint sequence between the target and query images.

3. Described is a method and system for forming fingerprints from combinations of keypoints in a local neighborhood around one or more anchor points. The method allows for up to a given number of non-anchor keypoints to be missing and still obtain a valid fingerprint match.

4. Described is a method and system for analyzing the fingerprint strength and selecting a smaller subset of the most distinctive keypoints for fingerprint matching. By retaining only the strongest most distinct fingerprints, the present method and system can achieve significantly higher performance with minimal loss of accuracy, and the amount of memory required for storing the picture collection fingerprint information is substantially reduced.

5. Described are methods and systems for computing fingerprints from neighborhoods of keypoints that reduce the number of equivalence classes found by permutations due to image rotation. The present approach is based on extending the Smallest Least Common Digit (SLCD) method of to the case of mixed anchor fingerprints. By using the SLCD method there is substantial reduction of the resulting number of fingerprint permutations.
6. Described are methods and systems for dealing with the remaining permutations of fingerprints in the case of mixed anchor fingerprints.
7. Described is an extended method and system to determine the fingerprint center of origin using a sub-group of anchor points and keypoints that is particularly useful to stabilize the ordering of keypoints in each localized fingerprint neighborhood. The center of origin is computed from the current and anchor keypoint locations, and possibly a few of the closest non-anchor keypoints to the current keypoint, to allow for missing or extra keypoints due to noise, image degradations, and changes in viewing geometry (such as under affine transformations). The method improves the robustness of keypoint ordering to noise and rounding errors, and leads to better fingerprint matching between the query and target images.
8. A modified Noise Guard method and system applicable to the case of mixed anchor point fingerprints is described which overcomes an issue with the sensitivity of fingerprint quantization to noise near the quantization thresholds. The Noise Guard can be applied either offline during picture collection pre-processing or online at query time. The problem occurs in situations where one of the distortion-invariant triangle-area ratios of a fingerprint results in a value that falls near one of the quantization levels, such that a small amount of noise may lead to the wrong quantized digit and fewer correct fingerprint matches. The Noise Guard method monitors the pre-quantized values, and in the event they fall close to a quantization level, within a pre-specified interval, both fingerprint combinations can be generated and processed on the fly.
9. Introduced is a compact intermediate fingerprint data representation that uses memory efficiently and is far smaller than a corresponding descriptor size. Instead of generating all the possible fingerprint permutations in advance and registering them in the hashtable or Fan Tree, only a minimum necessary set is generated, from which all the other combinations can be easily and systematically derived. The compact representation retains the fingerprint identity for each image. A second aspect of the compact representation is that it enables easy manipulation of the picture collection fingerprint information, such as for adding or removing pictures to the collection, without having to store and reprocess the original pictures.
10. Introduced is an advanced weighted fingerprint scoring analysis. Instead of using simple voting, the counts of matching fingerprints in one or more image zones are processed, possibly using different weights, in order to select the best matching picture or picture set in the collection. The weighting function can be used to emphasize certain image areas over others, for example, giving more weight to fingerprints at the center of the image area than at the periphery. Likewise, the confidence in a correct match between a query and target image can be increased by analyzing the distribution of resulting fingerprint match counts in each zone rather than relying on the total number of matches overall. A low fingerprint match count in a given zone might indicate a missing or otherwise obscured image area, for example. Finally, the confidence in a given query match can be estimated by counting the number of matching fingerprint in each zone and normalizing by the known number of fingerprints in the target image.
11. Unlike SIFT and its derivatives, the present method and system is particularly suitable for parallel implementation since each pyramid level can be directly computed from the input image using the novel keypoint extraction method in U.S. patent application Ser. No. 12/147,867. The computation for each pyramid level is entirely independent of the other pyramid levels and takes exactly the same time regardless of the filter size. In contrast, the iterative nature of the conventional keypoint detection techniques that utilize a succession of Gaussian filtering and down sampling does not easily lend itself to parallel implementation. Thus the present method has the advantage of providing a fully parallel multi-scale picture matching scheme.
12. Introduced is a measure of keypoint strength for each keypoint candidate that can be used to determine the best (most distinctive) keypoints in an image and discard weak keypoints not likely to be found in a degraded noisy version of the image. Typically the top few hundreds of the strongest keypoints are the most useful for the purpose of image matching. Thus a considerable improvement in performance can be gained by concentrating on a small subset of the strongest keypoints, and only adding weaker keypoints in case the matching results are inconclusive. Alternatively, a desired number of keypoints of a pre-specified minimum strength can be determined in advance, and the keypoint identification process stopped as soon as a sufficient number of suitable keypoints have been identified. The keypoint strength is calculated on the fly during the keypoint extraction.

It is understood the above has been described with reference to matching pictures. It is, however, understood the concepts described herein can be applied to documents which are comprised of text and/or line art, as well as documents including pictures and text and/or line art, or any other images. It will also be appreciated that various of the above-disclosed and other features and functions, or alternatives thereof, may be desirably combined into many other different systems or applications. It is further understood that various presently unforeseen or unanticipated alternatives, modifications, variations or improvements therein may be subsequently made by those skilled in the art which are also intended to be encompassed by the following claims.

The invention claimed is:

1. An image management method for storing, indexing, searching and/or retrieving image data comprising the steps of:
   preprocessing, by at least one processor, content of an image collection to identify stable and repeatable keypoints for each image in the collection;
   computing, by at least one processor, fingerprint information from local groups of the keypoints;
   storing, by at least one processor, the resulting fingerprint information in a compact fingerprint database, wherein the computing of the fingerprint information is based on combinations of a sub-group of strongest keypoints in an image, called anchor keypoints, in addition to a number of non-anchor local keypoints and wherein strongest keypoints in an image means keypoints more likely to be found in an image as compared to non-anchor keypoints;

generating, by at least one processor, for each input fingerprint in the compact fingerprint database, a sequence of candidate fingerprint combinations;

storing, by at least one processor, the sequence of candidate fingerprint combinations for each fingerprint input into a fingerprint database in a fan tree and/or hashtable, and a corresponding fingerprint data structure;

performing, by at least one processor, a real-time image query by identifying keypoints and computing fingerprints from the query image and matching the query fingerprints to the existing fan tree fingerprint data to determine a matching target image or set of target images within the collection;

retrieving, by at least one processor, at least one target image based on the determining step; and at least one of displaying, printing, storing or transmitting the retrieved at least one target picture image.

2. The method of claim 1, wherein the matching of the query fingerprints to the existing fan tree fingerprint data, includes, calculating a fan tree address for each query fingerprint, leading to a particular fan tree leaf node list, containing a subset of the original fingerprint image collection, wherein the query fingerprints define paths from a root node of the fan tree through intermediate nodes of the fan tree to a leaf node of the fan tree;

sequentially comparing in turn each original fingerprint from the subset list with the current query fingerprint;

incrementing a count of the number of matching fingerprints for that image each time the query fingerprint matches one of the retrieved fingerprint records;

examining by a fingerprint score analysis module the resulting accumulated counts of matching fingerprints for each image; and determining a best matching image or set of images within the collection based on a highest score analysis.

3. The method according to claim 1, wherein anchor keypoints have a higher probability of being found in the query image and target image than non-anchor points.

4. The method according to claim 1, wherein the anchor keypoints are grouped together with non-anchor keypoints.

5. The method according to claim 1, wherein the anchor points are selected based on at least one of the keypoint strength, scale, location on page, and distance to other keypoints.

6. The method according to claim 1, wherein each anchor point is associated with a local region of influence.

7. The method according to claim 1, wherein the anchor points serve to synchronize the fingerprint sequence between the target and query images.

8. The method according to claim 1, wherein the fingerprints are formed from combinations of keypoints in a local neighborhood around one or more anchor points, wherein up to a predetermined number of non-anchor keypoints may be missing and a valid fingerprint match will still be obtained.

9. The method according to claim 1, wherein the image data is a continuous-tone picture.

10. The method according to claim 1, further comprising reducing a number of equivalence classes found by permutations due to image rotation, based on a smallest least common digit (SLCD) method.

11. The method according to claim 1, wherein determining fingerprints includes determining a fingerprint center of origin using a sub-group of anchor points and not using non-anchor keypoints, the fingerprint center of origin computed from a subset of the anchor keypoints closest to the current keypoint, the non-anchor keypoints not being used in the calculation of the center of origin in order to ensure that the origin will remain stable even in case of extra or missing non-anchor keypoints.

12. The method according to claim 1, further including applying a noise guard.

13. The method according to claim 1, wherein highest score analysis for the determining of the best matching image or set of images within the collection is a weighted fingerprint scoring analysis.

14. An image management system within a computer operable system for storing, indexing, searching, and/or retrieving image data comprising:

an identification module configured to identify keypoints in images, including keypoints in a query image of a query document and keypoints in potential target document images of a collection of potential target documents;

a fingerprint generation module configured to generate fingerprint information from the keypoints the fingerprint information, including at least one anchor keypoint and a predetermined number of non-anchor keypoints, wherein the at least one anchor keypoint is stronger than the predetermined number of non-anchor keypoints, the stronger keypoint in an image meaning the keypoint more likely to be found in an image as compared to the non-anchor keypoints;

a comparison module configured to compare the fingerprint information of the query image with fingerprint information of the potential target document images in the collection of potential target documents;

a matching module configured to determine a best match between the fingerprint information of the query image and the potential target document images;

a retrieval module configured to retrieve at least one target document image based on the determining step; and at least one of an electronic display, a printer, a memory storage or a computer network to display, print, store or transmit the retrieved at least one target document image.

15. The system of claim 14, wherein fingerprints and accompanying images are organized in a fan tree structure.

16. The system of claim 14, wherein the fingerprints and accompanying images are organized in a hash table.

17. The system of claim 14, wherein the image capture hardware comprises at least one of:

a digital camera, cell phone with a camera or a motion picture camera.

18. The system of claim 14, wherein the query image comprises pictures which are imperfect copies of target picture images.

19. The system of claim 14, wherein the fingerprints are computed using sequences of quantized transformation-invariant two-dimensional persistent ratios.

20. The system of claim 14, wherein a noise guard is employed to compensate for errors.

* * * * *